United States Patent [19]

Hunts et al.

[11] 4,129,813

[45] Dec. 12, 1978

[54] METHOD AND APPARATUS FOR ADAPTIVE CONTROL OF A STEPPER MOTOR

[75] Inventors: Barney D. Hunts; John B. S. Waugh, both of Mountain Lakes, N.J.

[73] Assignee: The Singer Company, New York, N.Y.

[21] Appl. No.: 819,188

[22] Filed: Jul. 26, 1977

[51] Int. Cl.² ........................................... G05B 13/00
[52] U.S. Cl. .................................. 318/561; 318/685; 318/696
[58] Field of Search ...................... 318/685, 696, 561; 364/105

[56] References Cited

U.S. PATENT DOCUMENTS

| 3,629,560 | 12/1971 | Slawson | 318/561 |
| 3,876,873 | 4/1975 | Slawson | 318/561 |

Primary Examiner—Robert K. Schaefer
Assistant Examiner—Eugene S. Indyk
Attorney, Agent, or Firm—Charles R. Lewis

[57] ABSTRACT

A real time, adaptive control system for a stepper motor is achieved by measuring specific real time characteristics and calculating therefrom the number of steps that will be required to decelerate the stepper motor to a complete stop at a desired position, all within a single displacement or move.

38 Claims, 26 Drawing Figures

| ADDRESS | | | DATA BUS | | | | | | | | OPERATION |
|---|---|---|---|---|---|---|---|---|---|---|---|
| ADR 2 | ADR 1 | ADR 0 | D7 | D6 | D5 | D4 | D3 | D2 | D1 | D0 | |
| L | L | H | PIL7 | PIL6 | PIL5 | PIL4 | PIL3 | PIL2 | PIL1 | PIL0 | READ PIL LSB |
| L | H | L | DIR | L | L | L | L | PIL10 | PIL9 | PIL8 | READ PIL MSB |
| L | H | H | CTR7 | CTR6 | CTR5 | CTR4 | CTR3 | CTR2 | CTR1 | CTR0 | READ COUNTER LSB |
| H | L | L | L | CTR14 | CTR13 | CTR12 | CTR11 | CTR10 | CTR9 | CTR8 | READ COUNTER MSB |
| H | L | H | ENC1 | ENC2 | X | X | X | X | X | X | READ ENCODER ENC1 ENC2 |

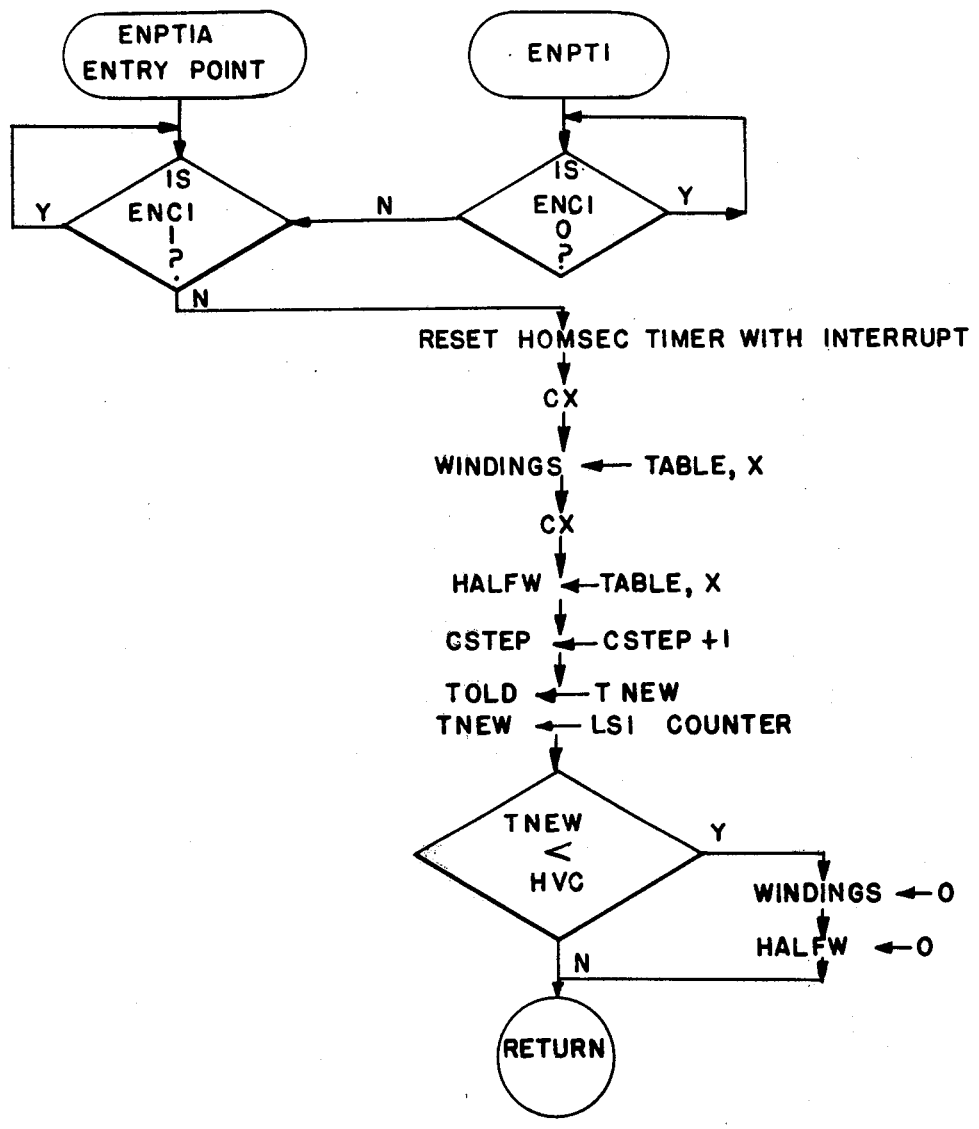
FIG. 20.
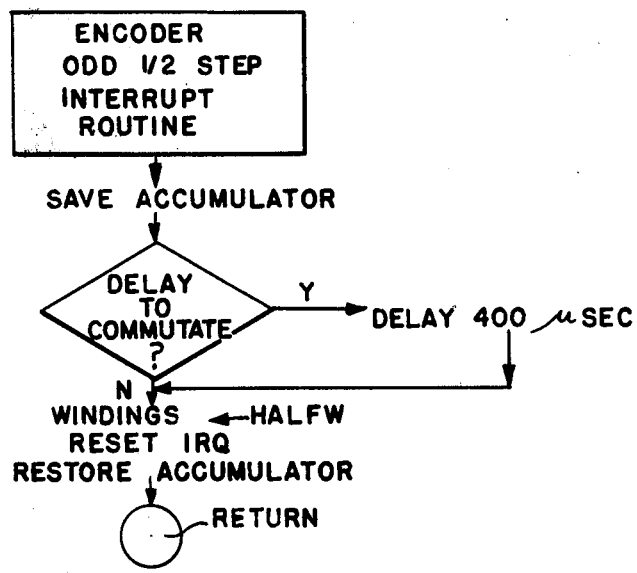

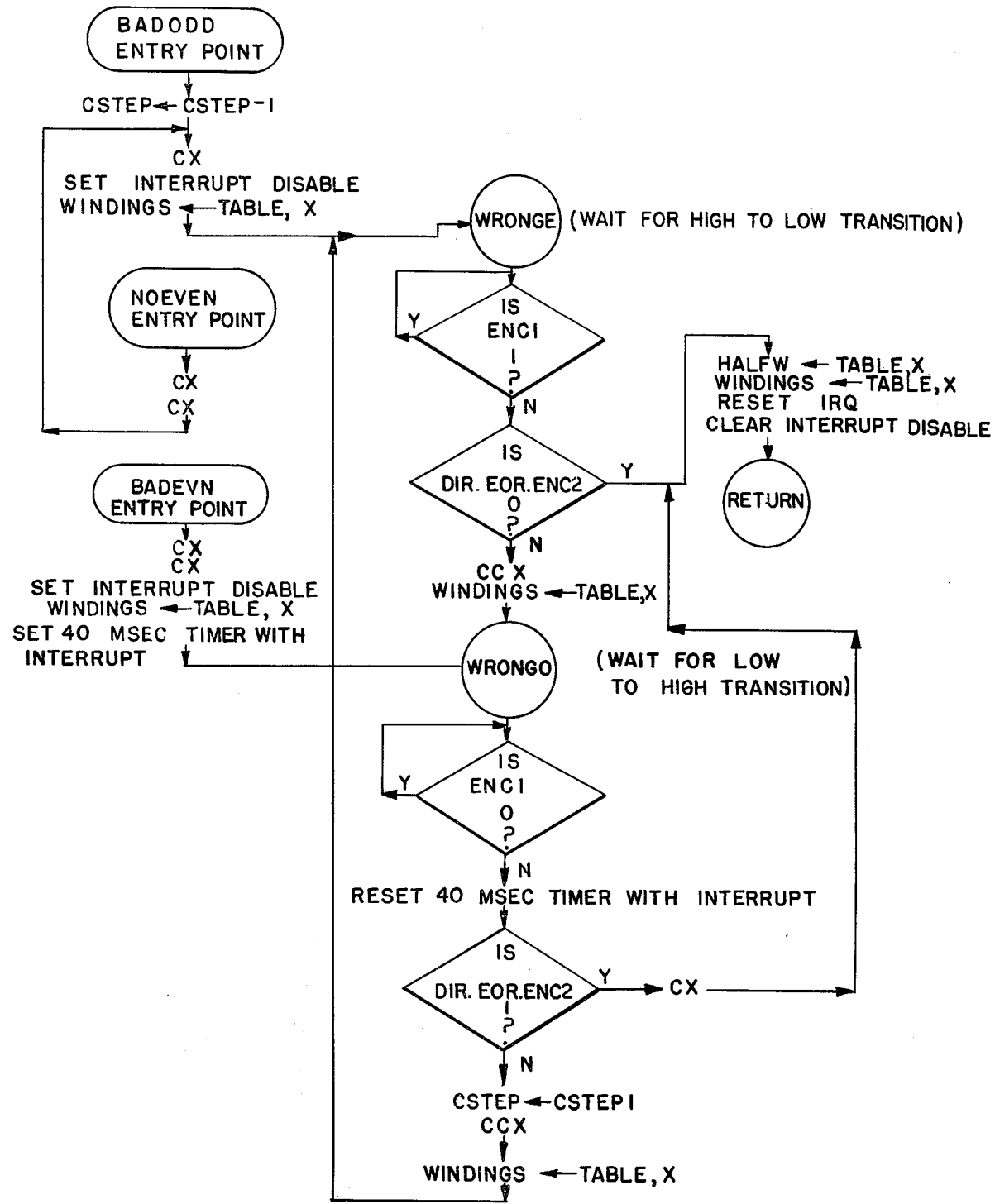
FIG. 24. DIRECTION MONITOR AND CORRECTION ROUTINE

METHOD AND APPARATUS FOR ADAPTIVE CONTROL OF A STEPPER MOTOR

BACKGROUND OF THE INVENTION

The present invention relates to adaptive stepper motor control systems and more particularly to a method and apparatus for controlling the deceleration of a stepper motor in accordance with measured real time characteristics of the motor and load.

Stepper motors are controlled by the input signals or pulses, applied thereto and are frequently used to position a load. For example, a stepper motor can be used to position a machine tool, such as a milling machine, with respect to a piece of material to be worked upon by the machine tool. In many instances, it is very desirable that the position of the load be accurately controlled. This requires the rotation of the stepper motor to be accurately controlled by means of the drive signals applied thereto. Heretofore in the prior art, accurate positioning of a load by a stepper motor has been achieved to a certain extent by determining the deceleration characteristics of the stepper motor and load and then utilizing these characteristics to compute the deceleration required to stop the stepper motor when the load is moved from one position to another. One disadvantage to this is that the deceleration characteristic of the stepper motor and load does not remain constant over a period of time nor, in many instances, does the deceleration characteristics remain constant from one move to another. This can be alleviated to some extent by determining the deceleration characteristic of the motor and load more often. Obviously, however, this is cumbersome and not economical.

Accordingly, an object of this invention is to provide an improved method and apparatus for determining the deceleration characteristic of a stepper motor and load.

Another object of this invention is to provide an improved method and apparatus for determining the real time deceleration characteristics of a stepper motor and load.

Still another object of this invention is to provide an improved method and apparatus for controlling a stepping motor.

A further object of this invention is to provide an improved method and apparatus for controlling a stepping motor wherein, for every move greater than a predetermined distance, the real time deceleration characteristics are measured during the move and are utilized to calculate the deceleration that will be required to bring the motor to a stop at the desired location.

SUMMARY OF THE INVENTION

Briefly described, these and other objects and features of the present invention are realized in an adaptive control system for a stepper motor that includes electrical means coupled to the stepper motor for driving the stepper motor for a predetermined number of steps. The electrical means also includes means to temporarily decelerate the stepper motor while the stepper motor is being driven the predetermined number of steps. Computing means coupled to the stepper motor during the temporary deceleration portion measures the deceleration characteristics of the stepper motor system and calculates the number of deceleration steps that will be necessary to bring the stepper motor to a stop. When the steps remaining in the move are substantially equal to the number of calculated steps of deceleration needed to stop the stepper motor, the electrical means will stop the stepper motor, in accordance with the calculations made by the computing means. Prior to being stopped in this manner, however, the stepper motor is again driven to the velocity that existed just prior to the temporary deceleration.

In one embodiment of the present invention the deceleration requirements are calculated by the computing means after the temporary deceleration only when the move exceeds a predetermined number of steps. For all other moves, the stepper motor is automatically accelerated and decelerated according to a fixed routine.

BRIEF DESCRIPTION OF THE DRAWINGS

The present invention will be clearly understood from the following detailed description taken in conjunction with the following drawings, wherein like reference characters designate like or corresponding parts throughout the several views, and wherein:

FIG. 10 is a chart which shows the status of the addressing signals applied to the LSI chip shown in FIG. 2 and the type of data that is read out from the LSI chip in response to these addressing signals; and FIGS. 11 through 24 constitute various flow charts of the program carried out by the system illustrated in FIG. 1.

DESCRIPTION OF THE PREFERRED EMBODIMENT

Figure 1:
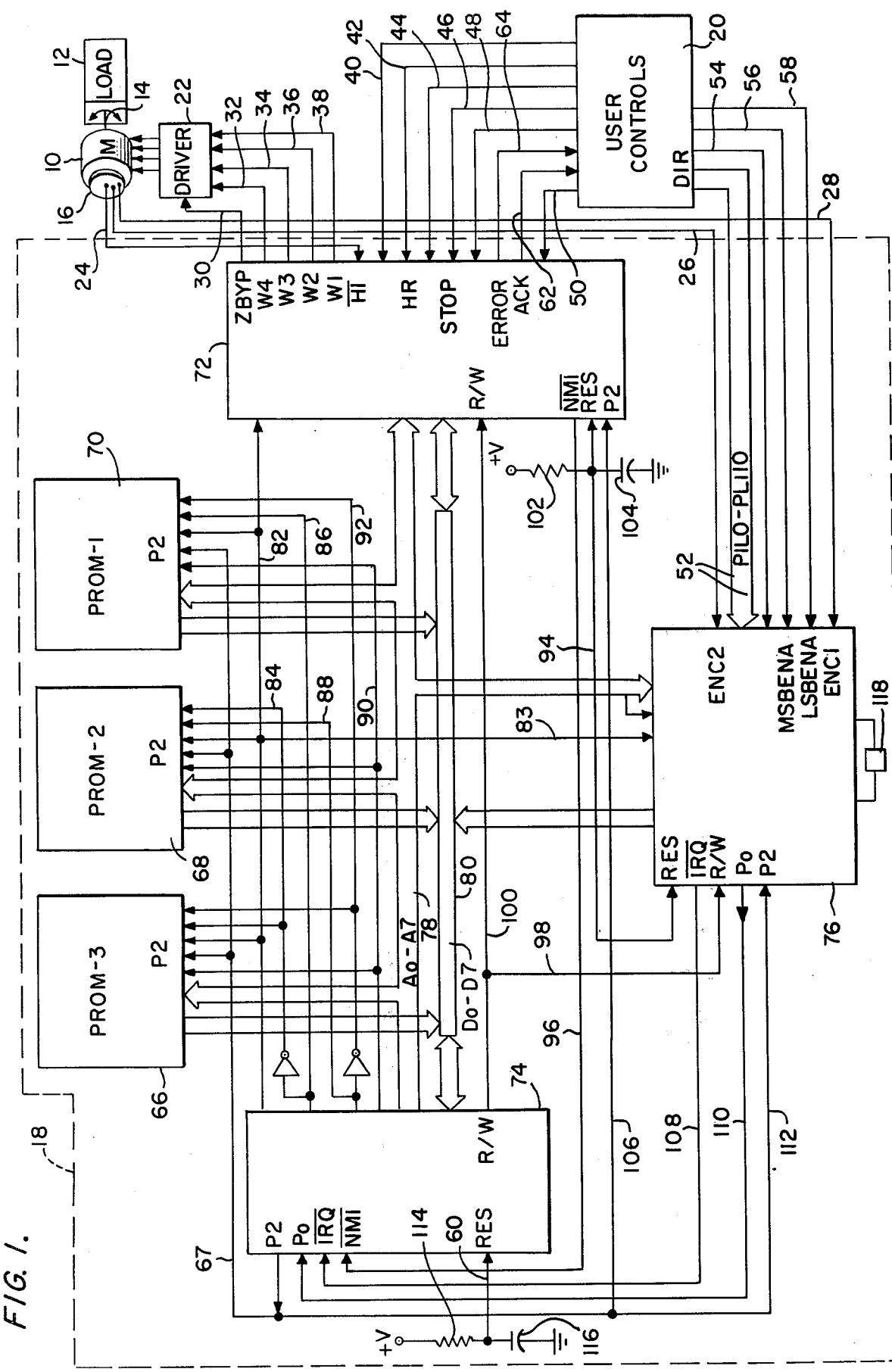
FIG. 1 is a block diagram of an adaptive stepper motor control system in accordance with the present invention.

The preferred embodiment of the present invention illustrated in FIG. 1 is described in conjunction with a digital feedback system for position control of a stepper motor 10. Position and control signals for actuating the stepper motor 10 in a desired manner are provided by user controls 20. Coupled to the stepper motor 10 and to the user controls 20 is a data processing system 18 that enables actuation of the stepper motor 10 in accordance with the signals supplied by the user controls 20.

The stepper motor 10 preferably comprises a variable reluctance, phase wound stepper motor and drives, or positions, a mechanical load 12 by means of the motor 10 shaft 14. In one embodiment of the invention which was constructed, the motor 10 included a Kearfott No. 20, four phase, fifteen degree stepper motor which enabled the load 12 to be moved from one to two thousand forty seven steps, where each step included fifteen degrees of rotation of the stepper motor 10.

Accordingly, each full cycle of rotation of the stepper motor 10 constitutes twenty four full steps.

In the description that follows, a signal is considered to be active when high except when otherwise designated or described.

The system motor 10 position feedback is provided by an optical encoder which includes a disk 16 which is attached to the motor 10 shaft 14 to rotate therewith. The optical encoder provides a first encoder 128 signal ENC1 (FIG. 4) which is applied to the data processor system 18 by way of a lead 28 and a second encoder 130 signal ENC2 which is applied to the processor system 18 by way of a lead 26. Additionally, the optical encoder provides a home indicate signal $\overline{HI}$ (active when low) to the processor system 18 by way of a lead 24.

Figure 3:
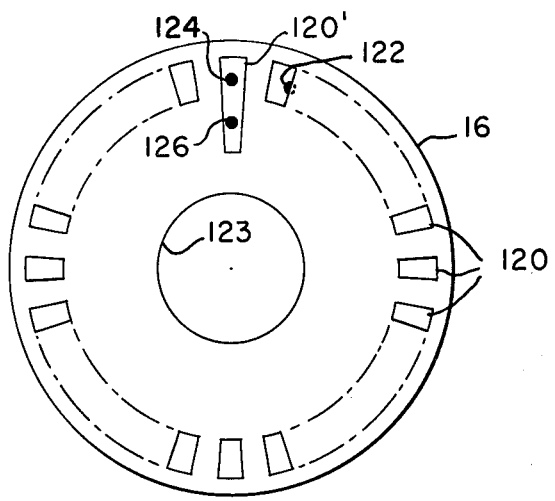
FIG. 3 is a plan view of a perforated disk that is attached to the stepper motor shaft to provide stepper motor position and speed signals to the system of FIG. 1.
Figure 4:
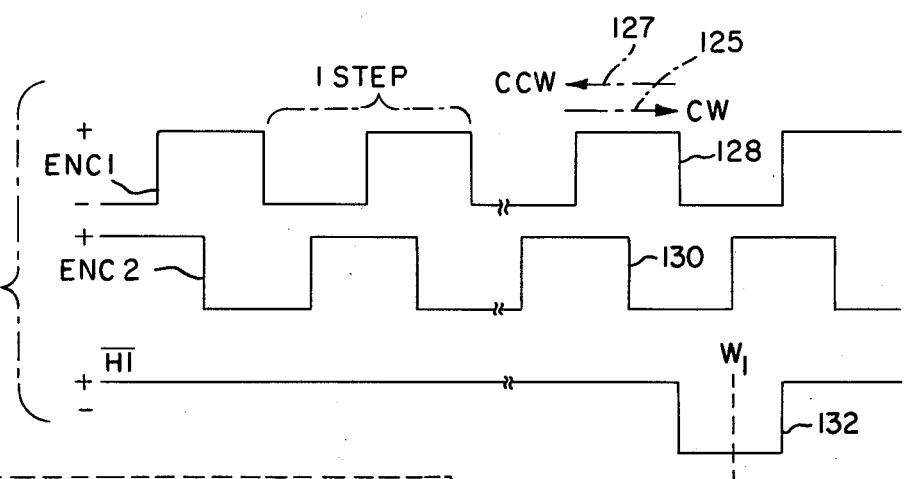
FIG. 4 illustrates idealized waveshapes which are generated by rotation of the disk shown in FIG. 3.

The generation of the ENC1, ENC2 and $\overline{HI}$ signals will be readily apparent from consideration of FIG. 3 wherein the disk 16 is illustrated in detail. The disk 16 includes a centrally located aperture 123 that enables the 16 disk to be secured to the motor 10 shaft 14 by any number of well known means. The disk 16 includes a plurality of openings 120 equally spaced around the periphery of the disk 16. In accordance with a preferred embodiment, there are twenty four equally spaced openings 120, each corresponding to a step of the motor 10. A first optical path 124 located normal to the plane of the disk 16 is sequentially interrupted by rotation of the disk 16. By positioning a source of light (not shown), such as a light emitting diode, on the optical path 124 on one side of the disk 16 and a light responsive element (not shown), such as a photo transistor, on the optical path 124 on the opposite of the disk 16, sequential interruption of the light path 124 by rotation of the disk 16 can be utilized to generate a square wave signal in a manner well known to those in the art. Such a signal is illustrated in FIG. 4 as the waveform 128 which constitutes the encoder signal ENC1. The encoder signal ENC2, illustrated in FIG. 4 by the waveshape 130, is generated in a like manner by way of a second optical path 122. As shown in FIG. 3, however, when the optical path 124 is in the middle of an opening 120, the optical path 122 is just beginning to be interrupted by the portion of the disk 16 between openings 120. Accordingly, since the width of the disk 16 portions that interrupt the light paths 124 and 122 between openings 120 are equal to the width of the openings 120, the ENC1 and ENC2 signals constitute square waves that are in quadrature, i.e. ninety degrees out of phase, as is illustrated in FIG. 4. As shown by FIG. 3, one 120' of the openings 120 is extended such that a third light path 126 is uninterrupted once for each complete rotation of the disk 16 to produce the $\overline{HI}$ signal which is illustrated in FIG. 4 by the waveshape 132. The $\overline{HI}$ signal 132 is coincidental with the center of the corresponding low portion of the ENC1 signal. The disk 16 is secured to the shaft 14 of the stepper motor 10 so that the disk 16 takes a stationary position as shown in FIG. 3 with respect to the light paths 122, 124 and 126 only when a single predetermined winding of the stepper motor is energized as is discussed hereinbelow.

Referring to FIG. 4 it is seen that for each step of rotation of the motor 10, the ENC1 signal includes a low portion corresponding to the time the light path 124 is uninterrupted and a high portion corresponding to the time the light path 124 is interrupted. Since there are 24 motor 10 steps for each complete rotation of the disk 16, each ENC1 cycle includes fifteen degrees of rotation of the stepper motor 10 with seven and a half degrees of rotation taking place during each half cycle of the ENC1 signal. As will now be apparent, the number of steps of rotation of the motor 10, and therefore the position of the load 12, can be controlled and/or monitored by the processor system 18 by monitoring ENC1 and ENC2 pulses. Also, the frequency or time duration of the ENC1 pulses are related to the speed of the motor 10 and therefore the ENC1 signals can be used by the processor system 18 to control and/or monitor the speed of the motor 10. Assuming that clockwise CW rotation of the motor 10 causes generation of the ENC1 and ENC2 signals as shown by the arrow 125 in FIG. 4 and that counterclockwise CCW rotation causes generation of the signals as shown by the arrow 127, then when the motor 10 is moving clockwise ENC1 will be low when ENC2 goes from low to high and when the motor 10 is moving counterclockwise ENC1 will be high when ENC2 goes from low to high. Accordingly, the ENC1 and ENC2 signals can be used by the processor system 18 to determine the direction of rotation of the motor 10.

Figure 6:
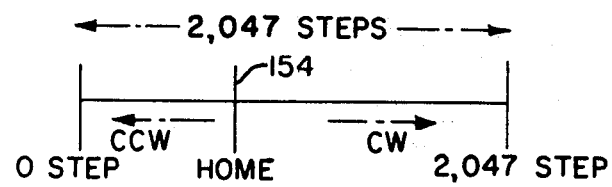
FIG. 6 is a graphical representation of the plurality of steps, or positions, to which the stepper motor in the system shown in FIG. 1 can be moved.

As discussed above, one embodiment of the present invention enabled the stepping motor 10 to be stepped from one to two thousand forty seven steps. These steps are graphically illustrated in FIG. 6. In order to enable the processor system 18 to keep track of the position of the load 12 by keeping track of the rotational steps of the motor 10, a mechanical reference or "home" position is required. In FIG. 6, the home position is located intermediate the first and last steps and is identified by the vertical line 154. The motor 10 is rotated in a clockwise direction to move the load 12 away from the home position in one direction and is rotated counterclockwise to move the load 12 away from the home position in the opposite direction. As will be apparent to those skilled in the art, the location of the home position 154 is entirely arbitrary and is usually decided by the move characteristics which the user of the system wishes to impart to the load 12. Accordingly, except when the home position 154 is located at the very beginning or at the very end of the number of steps that can be made and the step positions are identified by absolute addresses (discussed below), the system must indicate both the direction (clockwise or counterclockwise) and the location (step) to which the motor is to be rotated in order to place the load 12 at a desired position which corresponds to one of the two thousand forty seven rotational steps.

The motor 10 includes at least four winding 156, 158, 160 and 162 (FIG. 5) which are driven by pulse signals W4, W3, W2 and W1, respectively, generated by the processor system 18 on leads 32, 34, 36 and 38 respectively. These signals are amplified by a power driver 22 (FIG. 1) before being applied to the windings of the motor 10. A motor 10 winding 162, 160, 158 or 156 will be activated by the driver 22 whenever the corresponding signal W1, W2, W3 of W4 is high. Under normal operating conditions, counterclockwise rotation of the motor 10 is achieved by sequentially activating the windings 162, 160, 158 and 156 by sequentially actuating the drive signals as follows: W1, W1 and W2, W2, W2 and W3, W3, W3 and W4, W4, W4 and W1 etc. etc. Clockwise rotation of the motor 10 is achieved by reversing this sequence of drive signals. Only signal W1 being active can cause the motor 10 to take a position that places the disk 16 in a position relative to the optical paths 122, 124 and 126 shown in FIG. 3. The processor system 18 also applies a zener by pass signal ZBYP to the motor 10 driver 22 by way of a lead 30. This signal, as discussed below, is used when stopping the motor 10.

Figure 5:
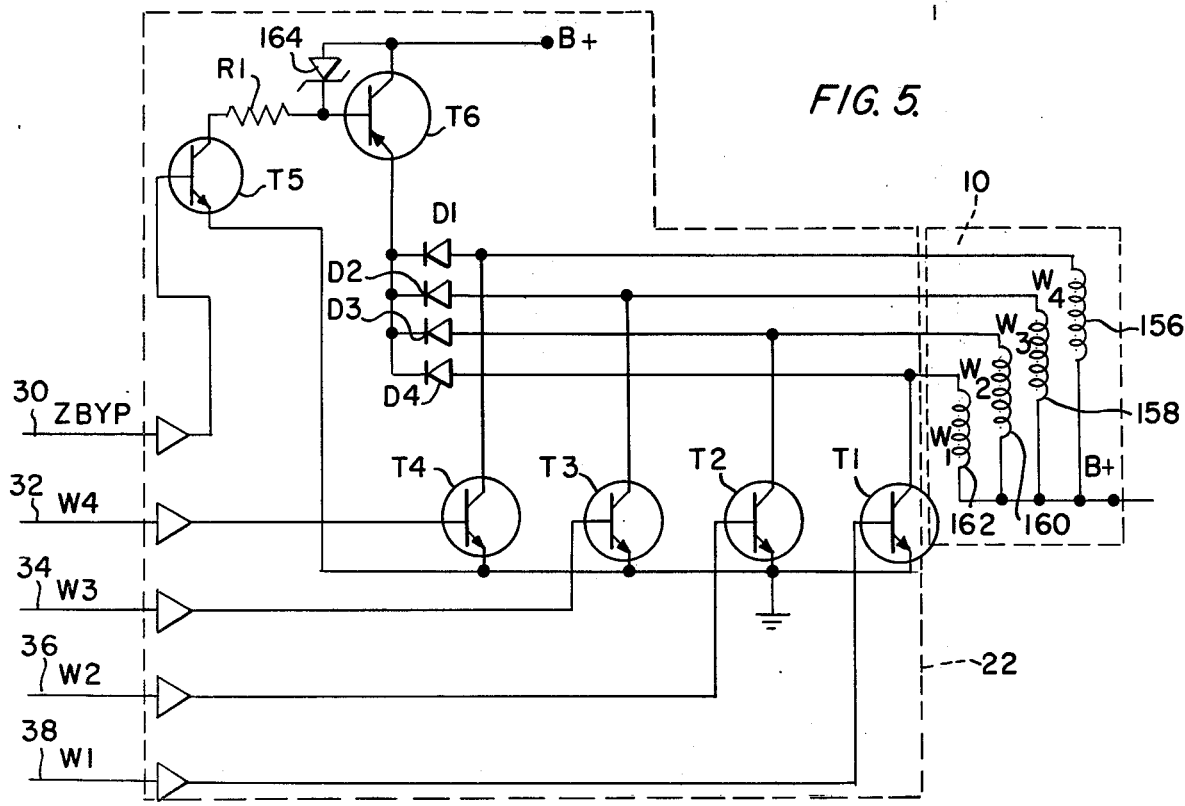
FIG. 5 is a schematic diagram of the driver circuit for the stepper motor in the system shown in FIG. 1.

The driver 22 circuit is shown in more detail in FIG. 5 wherein power transistors T1-T4 amplify the motor 10 drive signals W1-W4, respectively, prior to application to the motor 10 windings 162, 160, 158 and 156. Each of the power transistors T1-T4 has its collector coupled to the emitter of a transistor T6 by way of a diode D1-D4. A zener diode 164 is coupled across the base and collector terminals of the transistor T6 and a source of potential B+ is also coupled to the collector of the transistor T6. The base of the transistor T6 is coupled to the collector of a transistor T5 by way of a resistance R1 with the emitter of transistor T5 being coupled to the emitters of the power transistor T1-T4. The ZBYP signal is coupled to the base of transistor T5 and when active creates substantially a short circuit across the zener diode 164 so that current in the motor 10 windings 162, 160, 158 and 156 due to drive signals W1-W4 changes slowly. When ZBYP is inactive, the transistor T5 is nonconducting. Whenever any of the transistors T1-T4 becomes nonducting due to its associated input signal W1-W4 becoming inactive, it is not possible for the current in the associated motor 10 winding 162, 160, 158, or 156 to decrease instantly to zero. Accordingly, current will continue to flow through the associated diode D1, D2, D3 or D4 and through the zener diode 164 and transistor T6 with the zener diode 164 current flow being substantially less than but effectively controlling the emitter to collector current flow of transistor T6. The resulting voltage drop of about thirty volts across the zener diode 164 appears across the associated motor 10 winding 156, 158, 160 or 162 to allow the current therein to decay to near zero in a short time. When the ZBYP signal is active, the transistor T5 conducts through the zener diode 164 unless the voltage on the emitter of transistor T6 rises above B+, at which time T6 turns on, effectively placing a short circuit across the zener diode 164. Whenever any of the transistors T1-T4 become nonconducting due to its associated input signal W1-W4 becoming inactive, it is not possible for the current in the associated motor 10 winding 162, 160, 158, 156 to instantly decrease to zero. Accordingly, current will continue to flow through the associated diode D1, D2, D3 or D4 and through the transistor T6. However, since the voltage drop across transistor T6 is only a few volts, insufficient voltage is impressed across the associated motor winding 156, 158, 160 or 162 to cause the current flow therein to decay to near zero in a short time. Rather, current in the associated winding 156, 158, 160 or 162 will decay slowly. As will now be apparent, the presence of the ZBYP signal effectively increases the decay time of the windings of the motor 10 and is utilized to stop the motor 10 in a manner as described hereinbelow.

The user controls 20 (FIG. 1) may include a manually operated keyboard (not shown) that enables an operator to manually provide the desired operating signals for the motor 10 and receive and display to the status signals from the processor system 18 that indicate the condition of the motor 10. Alternatively, the user controls 20 may comprise an automatic data handling system (not shown) that supplies the operating signals and receives the motor 10 condition signals in accordance with an automatic control or data processing system that is entirely independent of the processor system 18. The user, by way of an eleven bit bus 52, supplies eleven position indication signals PIL0-PIL10 to the processor system 18 that specify the desired position of the load 12 that is to be moved by stepping the motor 10. The desired position is indicated in binary form on the eleven position lines PIL0-PIL10 where line PIL0 is the least significant bit of the position data. The use of 11 bits provides two thousand fourty seven distinct positions, each of which is represented by one of the two thousand forty seven steps of the motor 10 discussed above in conjunction with FIG. 6. The user, by way of a lead 54, provides a direction signal DIR to the processor system 18 that indicates whether the motor 10 is to be rotated clockwise or counterclockwise to arrive at the desired location indicated by the binary signals PIL0-PIL10. The user controls 20 generates a most significant bit enable signal MSBENA on a lead 56 to the processor system 18 and a least significant bit enable signal LSBENA on a lead 58 to the processor system 18. These two signals, MSBENA and LSBENA, enable the processor system 18 to accept the eleven bit position data PIL0-PIL10 from eight of the bus 52 lines of 11 of the bus 52 lines. This is desirable whenever the user controls 22 include a data handling system that includes an eight bit, rather than an eleven bit, word. When eight of the eleven bus 52 lines are used for presenting the position data to the processor system 18, the presence of the LSBENA signal enables the transfer of the least eight PIL0-PIL7 significant bits of the eleven bit position data to the processor system 18 on the first eight leads of the eleven lead bus 52. The presence of the MSBENA signal enables the transfer of the DIR signal to the processor system 18 by way of the lead 54 and the transfer of the remaining three most significant bits PIL8-PIL10 of the eleven bit position data to the processor system on the first three leads of the eleven lead bus 52. The order of occurence of the MSBENA and LSBENA signals is immaterial to the processor system 18 as long the data inputs remain consistent with the above. Simultaneous application of the MSBENA and LSBENA signals will enable simultaneous transfer of the direction DIR signal to the processor system 18 together with all eleven of the position signals PIL0-PIL10.

The user supplies a motion signal A/I on a lead 48 to the processor system 18 that indicates whether the position data PIL0-PIL10 is to be interpreted by the processor system 18 as an absolute number, or address, or whether the position data PIL0-PIL10 specifies the number of steps the motor 10 is to be incremented. When the absolute/incremental A/I signal is high the absolute mode of operation is signified. In this mode, the position data on PIL0-PIL10 is interpreted as an absolute position, where the home position 164 is defined as position zero. The DIR signal indicates whether the desired absolute position is located clockwise or counterclockwise from the present position. When low, the DIR signal indicates clockwise rotation and when high counterclockwise rotation. As will be apparent, if the home position is located at one or the other end of the possible two thousand forty seven steps, no direction DIR signal is necessary in the absolute mode of operation. When the A/I signal is low, the incremental mode of operation is signified. In this mode of operation the position data PIL0-PIL10 indicates the number of steps the motor is to be rotated from its current position. The step rotation is clockwise if the DIR signal is low and counterclockwise if the DIR signal is high.

When the motor 10 is stopped, the processor system 18 will supply a chopped signal having a frequency of about 8 KHZ and a duty cycle of about 25% to the single active winding 156, 158, 160 or 162 in order to keep the motor 10 rotor (not shown) stationary. If the load 12 on the motor 10 is such that this does not provide sufficient holding power, a user supplied low power disable signal (LPD) on a lead 40 is coupled to the processor system 18. The occurrence of this signal will result in the processor system 18 supplying an unchopped, or full DC signal, to the single active winding of the motor 10 to keep it stationary.

As discussed above, the motor 10 is assigned a mechanical reference or home position. The procedure of setting the home position is described below in detail and requires a user supplied home indicate enable signal $\overline{HIE}$ (active low) that is applied to the processor system 18 by way of a lead 50. This signal must be active $\overline{HIE}$ when the motor 10 is within 165° of the home position whenever the motor 10 is being homed.

A STOP signal supplied by the user on the lead 46 to the processor 18 will result in the motor 10 being decelerated to a stop and can be applied during motor 10 movement. Once the motor 10 has been homed as described below, the motor 10 can be moved from its current position back to the home position by the occurrence of a user supplied home request signal HR on a lead 42 to the processor system 18. Then after the direction DIR and position PIL0–PIL10 of a desired motor move has been entered into the system together with the type of move denoted by the A/I signal, a user supplied motion request signal MR on a lead 44 to the processor system 18 will cause the motor 10 to move from its current position to the new position.

During the course of the operation of the system illustrated in FIG. 1, the processor system 18 may supply signals indicative of the system operation to the user. For example, an ERROR signal will be supplied to the user controls 20 from the processor system 18 by way of a lead 64 whenever the motor 10 jams, whenever a STOP signal is entered, or whenever the motor 10 rotates eight full steps past the midpoint test region during a type III move. This move is described in detail hereinbelow. Also, an acknowledge signal ACK will be supplied to the user controls 20 from the processor system 18 by way of a lead 62 whenever the motor 10 is not moving.

As will now be apparent, the processor system 18 will control the stepper motor 10 in accordance with the control signals received from the user controls 20 and the motor position signals ENC1, ENC2 and $\overline{HI}$ provided by the optical encoder associated with the stepper motor 10. As illustrated in FIG. 1, the processor system 18 is a programmed, automatic data processing system that preferably includes a microprocessor chip 74 having an input/output (I/O) chip 72 operably coupled thereto. The system program is stored in three programmed read only memories 66, 68 and 70. Also part of the system is a custom LSI chip 76, the internal organization of which is discussed below in conjunction with FIG. 2. In accordance with a preferred embodiment of the present invention the microprocessor 74 constituted a MOS Technology Inc. Microprocessor 6503 and the I/O chip 72 constituted a MOS Technology Inc. Microprocessor 6530 I/O chip. Both of these MOS Technology Inc. devices are described in detail in the "MCS 6500 Microcomputer Family Hardware Manual" copyrighted 1975 by MOS Technology Inc., 950 Rittenhouse Road, Norristown, Pa. 19401, the contents of which are incorporated herein by reference. In accordance with a preferred embodiment of the present invention, the three PROMS 66, 68 and 70 constituted three Model HM-7641 chips from Harris Semiconductor, a division of the Harris Corporation of Cleveland, Ohio. All of the processor system 18 output signals emanate from the I/O chip 72. Input signals relating to the type of motor 10 motion desired such as A/I, $\overline{HR}$, MR and motor 10 control signals such as $\overline{HIE}$, LPD, $\overline{HI}$ and STOP are inputted into the processor system 18 by way of the I/O chip. The ENC1 and ENC2 signals for determining the speed and location of the motor 10 are input into the processor system 18 by way of the LSI chip 76 as are the motor direction DIR and position designation signals PIL0–PIL10, MSBENA and LSBENA. The system includes an eight bit D0–D7, bidirectional data bus 80 that interconnects the microprocessor 74, I/O chip 72, LSI chip 76 and the three program storage chips 66, 68 and 70. All data and instructions are carried on the data bus 80. An eight bit A0–A7, unidirectional address bus 78 couples the microprocessor 74 generated addresses to the I/O chip 72, LSI chip 76 and the program storage chips 66, 68 and 70. A plurality of chip select leads 82, 84, 86, 88, 90 and 92 emanate from the microprocessor 74. Predetermined ones of these leads are coupled to the I/O chip 72, LSI chip 76 and program storage chips 66, 68 and 70 in a manner as shown in FIG. 1. In general, the microcomputer 74 generated signals on the chip select leads 82, 84, 86, 88, 90 and 92 determine which of the remaining chips is to be selected for data withdrawal therefrom or insertion of data therein while the microcomputer 74 generated signals on the address bus 78 determines what data is withdrawn or where entered data is placed. As will be apparent to those skilled in the art, a predetermined combination of both chip select signals and address signals can be used for both selective chip actuation and addressing.

Each time power is applied to the processor system 18, it is necessary that the supply voltages and system clocks be stabilized before a reset signal RES is applied. This is required so that the processor system 18 will always initialize into a known state and is accomplished by having the RES signal remain low after power is turned on until all voltages and clocks are stabilized after which RES becomes high to reset the system. This is provided by a first RC circuit that includes a resistor 102 coupled between a positive source of potential and a capacitor 104 the opposite side of which is grounded. The junction of the resistor 102 and capacitor 104 is coupled to I/O chip 72 and the LSI chip 76 by way of a lead 94. When power is turned on the RES signal on lead 94 remains low until the capacitor charges in accordance with the resistor 102 capacitor 104 time constant. When RES does become high the I/O chip 72 and LSI chip 76 clocks and voltages have been stabilized. A similar RES signal is applied to the microcomputer 74 by way of a lead 60 by a second RC circuit that includes a resistor 114 and a capacitor 116. Since the microcomputer 74 must reset last, the time constant of the resistor 114 capacitor 116 is greater than the time constant of the resistor 102 and capacitor 104.

A count of the ENC1 signals performed within the I/O chip 72 enables the processor system 18 to keep track of the location of the load 12. A counter (described hereinbelow in conjunction with FIG. 2) in the LSI chip 76 enables the processor system 18 to monitor the speed of the motor 10. Data flow is from the LSI chip 76 along the data bus 80 to the I/O chip 72 where it becomes available to the microprocessor 74. The frequency of an oscillator (described below in conjunction with FIG. 2) in the LSI chip 76 is controlled by a crystal 118. After being reduced in frequency by dividers, the resulting signal Po is applied to the microcomputer 74 by way of a lead 110. The microcomputer utilizes this Po signal to generate the system clock signal P2. During one half cycle of the clock P2 the address bus 78 is actuated by the microcomputer 74 and during the next half cycle of the clock P2 data transfer takes place by way of the data bus 80. The microcomputer 74 generates a read-write R/W signal that is applied to the I/O chip 72 and the LSI chip 76 by way of leads 100 and 98 respectively. The R/W signal is used to control the transfer of data from the LSI chip 76 to the I/O chip 72 and to control the transfer of data to and from the microprocessor 74 and the I/O chip 72. The I/O chip 72 will generate a non-maskable interrupt NMI on a lead 96 to the microprocessor 74 whenever the I/O chip needs service from the microprocessor 74. The LSI chip 76 generates an interrupt $\overline{IRQ}$ (active low) signal on a lead 108 to the microprocessor 74. This interrupt signal $\overline{IRQ}$ is used to update the motor 10 winding energization signals W1-W4 during the course of moving the load 12 by the motor 10 under control of the processor system 18 program.

Figure 2:
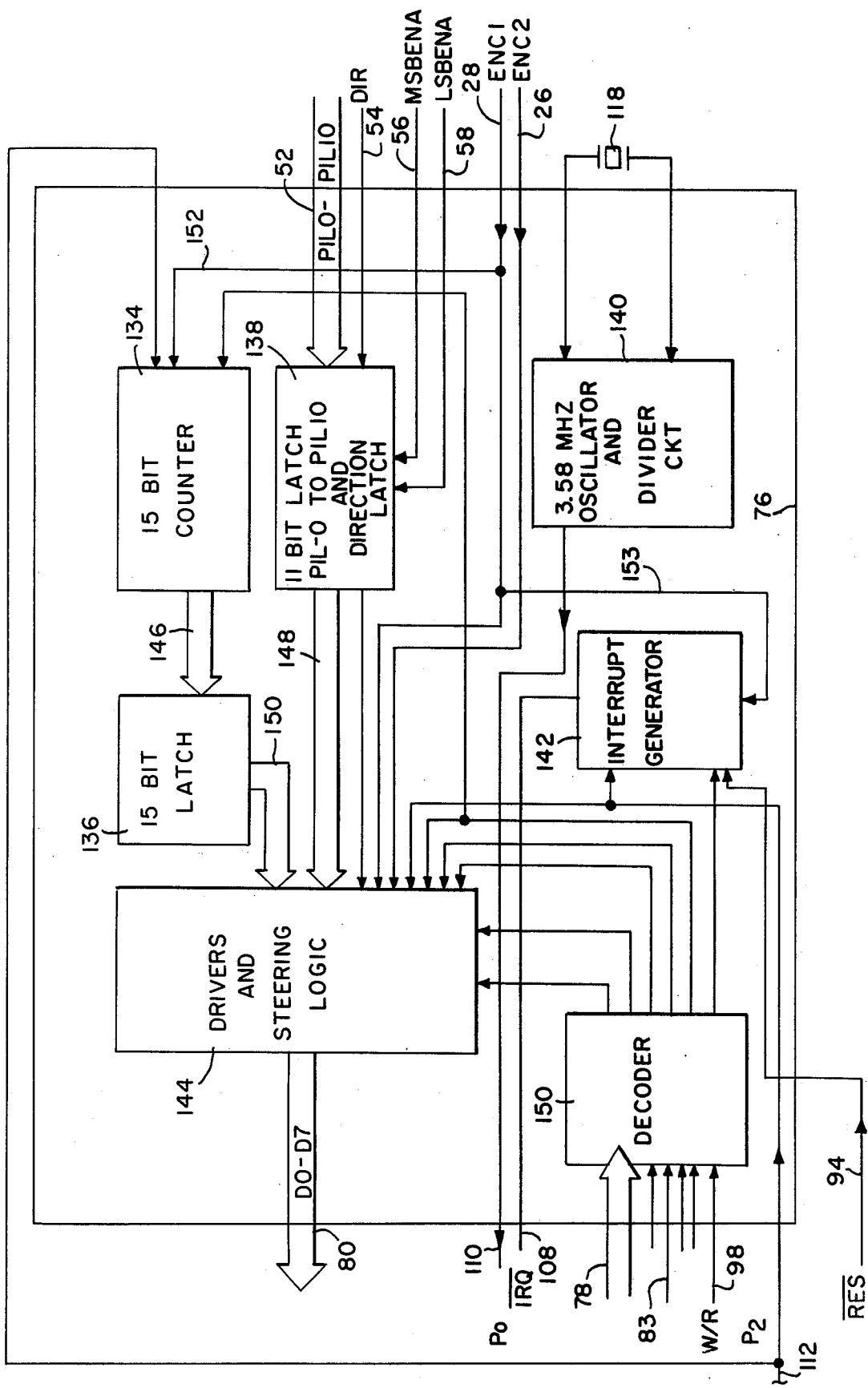
FIG. 2 is a logic block diagram of an LSI chip which is utilized in the system of FIG. 1.
Figures 10, 18:
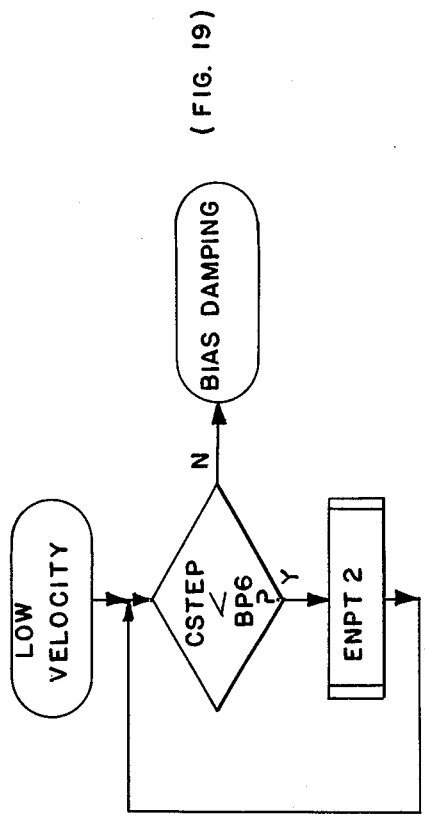

The internal organization of the LSI chip 76 is illustrated in block diagram form in FIG. 2. The chip includes a 3.58 MHz oscillator and frequency divider circuit 140. The frequency of the oscillations are closely controlled by the 3.58 MHz crystal 118. The frequency of the oscillations are divided by four to produce a 895 KHz signal P0 that, as described above, is utilized by the microcomputer 74 to produce a 895 KHz clock signal P2. The eleven bit position signals PIL0-PIL10 and the single bit direction DIR signal are temporarily stored in a twelve bit latch circuit 138 and are coupled to the processor system 18 data bus 80 by way of a bus 148 and a tri-state steering logic circuit 144. The encoder ENC1 and ENC2 are also coupled to the system data bus 80 by way of the steering logic 144. The clock pulses P2 on lead 112 are applied to a fifteen bit counter 134 which is used to time the motor 10 step motion in order to enable the speed, or angular velocity, of the motor 10 to be calculated by the processor system 18. The counter 134 counts the clock pulses P2 during one complete cycle of the ENC1 signal (FIG. 4), which corresponds to one complete step of the motor 10. The ENC1 signal is coupled to the counter 134 by way of a lead 152. At the end of the step, when ENC1 goes from high to low, the count in the counter 134 is transfered to a fifteen bit latch circuit 136 by way of a fifteen bit bus 146. In the event that the counter 134 were to count to a full count, a jam of the motor 10, or a motor 10 speed less than that allowed, would be indicated and the motor 10 would be automatically stopped in a manner as is described hereinbelow in detail. The count in the latch 136 is coupled to the processor system 18 data bus 80 by way of a bus 150 and the steering logic 144. The counter 134 is disabled during the time the count therein is transferred into the latch circuit 136 which requires a time interval equal to two clock pulses P2. Accordingly, the counter 134 is preset to a count of two before it is enabled to count the remaining time interval of the next ENC1 cycle. The ENC1 signal is also applied to an interrupt generator 142. Each time the ENC1 signal makes a low to high transistion (FIG. 4) the interrupt generator 142 will produce an interrupt signal $\overline{IRQ}$ on the lead 108 that is utilized by the processor system 18 to update the driving signals W1-W4 of the motor 10. The interrupt generator 142 is reset under control of the processor system 18 program. The data stored within the latches 136 and 138 of the LSI chip 76 are selectively coupled to the system data bus 80 by the occurrence of the appropriate signals on the address bus 78 and the chip select signal on the lead 83 which are coupled to a gated AND function decoder 150, the output of which is coupled to the steering logic 144. The relationship between the address signals and their status (high=H, low=L) and the corresponding data they cause to be read out of the LSI chip 76 are illustrated in FIG. 10.

A full and detailed description of the processor system 18 including the LSI chip 76 is contained in the detailed program listing which is appended to and made part of this specification and the program flow charts illustrated in FIGS. 11-24.

Before consideration of the operation of the overall system illustrated in FIG. 1, it will be helpful to consider the various types of moves imparted by the processor system 18 to the motor 10 and the various routines and procedures that are performed by or in conjunction with the processor system 18. In accordance with the present invention, a type I move is imparted to the motor 10 whenever the motor 10 is to be moved less than a first predetermined number of steps, a type II move is imparted to the motor 10 whenever the motor 10 is to be moved more than the first predetermined number of steps but less than a second predetermined number of steps, and a type III move is imparted to the motor 10 whenever the motor 10 is to be moved more than the second predetermined number of steps. A type I move is made whenever the motor 10 is to be moved only a few steps and a type II move is made whenever the move is not long enough to make a type III optimal. In accordance with an embodiment of the present invention that was constructed, a type I move occurred when the motor 10 was moved eight steps or less, a type II move occurred when the motor 10 was moved from nine to ninety nine steps, and a type III move occurred when the motor 10 moved more than ninety nine steps.

Figure 7:
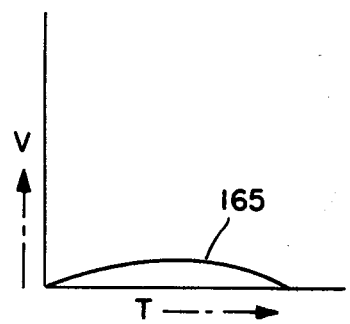
FIGS. 7, 8A, 8B, 9A and 9B illustrate the velocity profiles of the various movements made by the stepper motor in the system of FIG. 1 in accordance with the present invention.

The velocity versus time or distance of a type I move is illustrated by a curve 165 in FIG. 7. As shown, the motor 10 is initially accelerated slightly and then decelerated to a stop. This is accomplished by the processor system 18 activating the ZBYP signal and impressing a 15° lead angle on the motor 10 windings to initiate the move. After the first ENC1 transition, the lead angle is increased by 7.5°. During the last two full steps of the move the lead angle of the motor 10 drive signals W1, W2, W3 and W4 is not changed. Rather, at the beginning of the last two steps of the move bias damping is initiated to stop the motor 10 at the desired location. Bias damping is described in detail hereinbelow. Once the motor 10 is stopped bias damping is removed leaving only the appropriate single motor 10 winding 156, 158, 160 or 162 energized, the single activated winding drive signal W1, W2, W3 or W4 will be chopped if the LPD signal is inactive but will constitute a full DC signal if the LPD signal is active, and the ACK signal will be active. During a type I move, the angular velocity of the motor 10 is prevented from exceeding six hundred full steps per second by the heavy damping when T5 is conducting. As will be apparent to those skilled in the art, this is accomplished by the programmed data processing system 18 determining the speed of the motor 10 by the time occurrence of the ENC1 pulses and then controlling the motor 10 drive signals W1–W4 to insure that the motor 10 speed is controlled as desired.

Figure 8A:
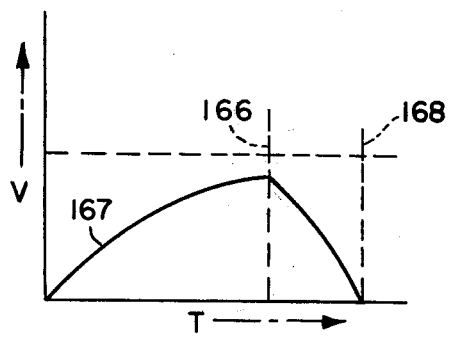
Figure 8B:
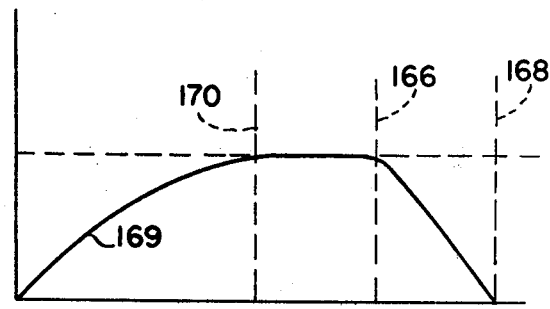

The velocity versus time, or distance, of a type II move is illustrated by curves 167 and 169 in FIGS. 8A and 8B, respectively. As shown in FIG. 8A, the motor 10 is accelerated for a predetermined portion of the move after which the motor 10 is decelerated to a stop at the desired position. The entire move is controlled by the processor system 18 which causes the ZBYP signal to become inactive at the start of the move and causes the lead angle of the motor 10 drive signals W1–W4 to have a lead angle of 15° to initiate the move of the motor 10. At each transition of the ENCl signal after the move is initiated, the lead angle is set to 26.25°. At the high to low transition of the ENCl signal immediately preceding the point where the motor 10 position is five full steps before three fourths of the total move length, deceleration begins. The beginning of the actual deceleration of the motor 10 is indicated by the vertical line 166 in FIGS. 8A and 8B. When deceleration begins, the lead angle of the drive signals W1–W4 is switched to a lag angle of 3.75° and at each ENCl transition 10 thereafter the lag angle changes from 11.25° to 3.75°. This resetting of the 11.25° lag angle continues until the time between two ENCl transitions (the time of a half step of motor 10 motion) exceeds seven hundred fifty microseconds, at which point the motor 10 velocity is low enough to be brought to a complete stop at the desired position by executing a type I move as described above. The final position of the motor 10 is indicated by the vertical line 168 in FIGS. 8A and 8B. During acceleration, the motor 10 speed is prevented from exceeding two thousand one hundred ninety full steps per second. The velocity profile of FIG. 8A is that of a type II move during which the motor 10 velocity does not reach the maximum allowed velocity. The speed profile of a type II move during which the maximum motor 10 velocity is reached is shown by the curve 169 of FIG. 8B. Reference to FIG. 8B shows that at the time, or position, indicated by the vertical line 170, the motor 10 reached the maximum permissible velocity of two thousand one hundred ninety full steps per second. Thereafter the motor 10 speed remains constant, as shown by the flat portion of the curve 169, until the time 166 of deceleration is reached.

Figure 9A:
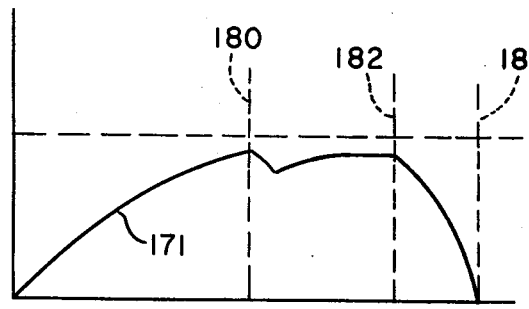
Figure 9B:
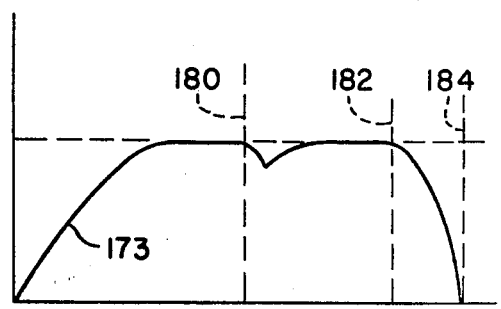

The velocity versus time, or distance, of a type III move is illustrated by curves 171 and 173 in FIGS. 9A and 9B, respectively. As shown in FIG. 9A, the motor 10 is accelerated, as in a type II move, for a predetermined portion of the move length after which the motor 10 is temporarily decelerated. During this temporary deceleration, the deceleration characteristics of the motor 10 and the load 12 are measured by the processor system 18 and the number of steps needed to decelerate the motor 10 to a stop from the motor 10 velocity existing just prior to the temporary deceleration is calculated. After the completion of the temporary deceleration, the motor 10 is accelerated to the velocity that existed just prior to the temporary deceleration after which the motor 10 velocity remains constant. The number of steps required to decelerate the motor to a stop is then calculated by the system. Once the steps remaining in the move are equal to the calculated number of deceleration steps needed to bring the motor 10 to a stop, the motor is decelerated to a stop in accordance with the calculated deceleration requirements. A type III move is accomplished under the control of the processor system 18 and includes inactivating the ZBYP signal and impressing a 15° lead angle on the motor 10 driving signals W1–W4, to initiate the move. At each transition of the ENCl signal after the move is initiated, the lead angle is increased to 26.25° and the motor 10 is accelerated. The system 18 will store the time duration of the complete ENCl cycle (one complete motor 10 step) immediately preceding the midpoint of the move which is indicated by the vertical line 180 of FIG. 9A. As discussed above, this time duration can be utilized to determine the speed of the motor 10. At the high to low transition of the ENCl signal immediately preceding the midpoint 180 of the move, the ZBYP signal is made high. During the next four full steps the motor 10 drive signal's W1–W4 lead angle is set at 26.25° at each transition of the ENCl signal and the motor 10 is then temporarily decelerated by switching the lead angle to a lag angle. The motor 10 is decelerated for two full steps during which time the lag angle is set at 3.75° at each transition of the ENCl signal. The processor system 18 stores the time duration of the first and second deceleration steps by storing the counts in the counter of 134 of FIG. 2 between the consecutive high to low ENCl signal transitions during these first two full steps of deceleration. The processor system 18 also compares the time duration of these two deceleration steps. If the time duration of the second full step of deceleration is greater, by a predetermined amount, than the time of the first full step of deceleration, the number of steps to decelerate the motor 10 to a complete stop from the velocity existing just prior to the temporary deceleration is calculated in a manner as set forth hereinbelow. If the time duration of the second full step is not greater than the first full step of deceleration, the processor 18 discards the time duration of the first step of deceleration and stores and compares the time duration of the third full step of deceleration with the second full step of deceleration. This storing and comparing continues until the time duration of a full step of motor 10 deceleration is greater than the preceeding full step of deceleration by the predetermined amount or until the motor 10 rotates eight full steps past the midpoint 180. In one embodiment of the present invention which was constructed, this predetermined amount of deceleration time difference constituted two counts of the fifteen bit counter 134 shown in FIG. 2. If the eight full steps of motor 10 rotation past the midpoint 180 takes place without the predetermined time difference between adjacent deceleration steps occurring, the motor 10 will be stopped by the processor system 18 activating the motor 10 drive signals W4, W1 and W2 and then waiting two seconds before activating the ERROR signal and the ACK signal, and turning off all drive signals W1–W4 to the motor 10 windings 162, 160, 158 and 156 respectively. When the motor 10 is stopped in this manner, the processor system 18 does not know the location of the motor 10 and the motor 10 must be returned to its home position before another motion request MR by the user can be executed.

If the predetermined time difference between adjacent full steps of deceleration does occur, the processor system 18 will calculate the number of steps NS of constant deceleration needed to bring the motor 10 to a stop from a velocity equal to the motor 10 velocity that existed just prior to the temporary deceleration, by the following equation $$NS = \frac{0.5\, Tl}{(TL - TO)} + N$$

where T1 is the time duration of a full step of motor 10 deceleration that exceeds the time duration T0 of the preceding full step of deceleration by at least the predetermined amount. The constant N is a safety factor set equal to (8) eight to prevent overshoot of the motor 10 when it is brought to a stop.

As shown by the curve 171 of FIG. 9A, once the temporary deceleration has provided the data to enable the number of deceleration steps to be calculated, the motor 10 is again accelerated and the ZBYP signal inactivated. This is accomplished by the processor system 18 again setting the lead angle of the motor 10 drive signals W1–W4 to 26.25° at each ENC1 signal transition. The motor 10 will be accelerated by the processor system 18 to the speed that existed just prior to the temporary deceleration. The time duration of the full step of motor 10 motion just prior to the temporary deceleration stored in the processor system 18 is utilized by the processor system 18 to maintain the speed of the motor 10 at the velocity that existed just prior to the temporary deceleration until the number of steps remaining in the move is equal to the calculated number of deceleration steps needed to stop the motor 10. When this point is reached the motor will be decelerated by the processor system 18 activating the ZBYP signal and switching the motor 10 drive signals W1–W4 to a lag angle of 3.75° and at every half step thereafter (at every transition of the ENC1 signal) the lag angle changes from 11.25° to 3.75°. The beginning of the deceleration is indicated by the vertical line 182 in FIG. 9A. This continues until the time between any two ENC1 signal transitions (time for a half step) exceeds seven hundred and fifty microseconds at which point the speed of the motor 10 is slow enough to enable the motor 10 to be stopped by a type I move. The motor 10 is thus stopped at the desired location at the end of the move indicated by the vertical line 184 in FIG. 9A.

As will now be apparent, the motor 10 receives substantially the same deceleration from the drive signals W1–W4 during the deceleration portion of a type II and type III move and during the temporary deceleration portion of a type III move. Additionally, when performing a type III move, the motor 10 is preferably accelerated to the velocity that existed just prior to the temporary deceleration before the motor 10 is decelerated to a stop in accordance with the calculated number of deceleration steps. As will also be apparent, a type III move is a real time adaptive motor 10 control method that measures specific, real time characteristics of the motor 10 and load 12 to calculate the appropriate number of deceleration steps NS and performs the necessary deceleration to stop the motor 10 at the desired position all within a single system displacement or move.

During the two motor 10 acceleration portions of a type III move, the motor speed is prevented from exceeding two thousand one hundred ninety full steps per second. The velocity profile of FIG. 9A is that of a type III move during which the motor 10 speed does not exceed the maximum allowed velocity. The speed profile of a type III move during which the maximum motor 10 speed is reached is shown by the curve 173 of FIG. 9B. Reference to FIG. 9B shows maximum allowable motor 10 speed prior to the time 180 by the flat portion of the curve 173 to the left of the vertical line 180 and maximum allowable motor 10 speed prior to the time 182 of deceleration to a stop by the flat portion of the curve to the left of the vertical line 182.

As described above, bias damping is utilized at the end of a type I, II and III move. This is done to damp any motor 10 oscillations that may exist to enable a smooth stop to be made at the final position. Bias damping is performed under control of the processor system 18 which, when the motor 10 has moved to within one full step of the final position, initially turns off all drive signals W1–W4 to the motor 10. When the next high to low transition of the ENC1 signal occurs, the winding 162, 160, 158, or 156 on which the motor 10 is to stop and the two windings adjacent to it are energized. This is maintained for ten milliseconds after which the adjacent windings are de-energized. The power applied to the single winding on which the motor is stopped is chopped, or is an uninterrupted DC signal depending upon the level of the LPD signal, as was described above.

As discussed above, the motor 10 velocity is prevented from exceeding a speed of two thousand one hundred ninety full steps per second during the acceleration portions of a type III and a type II move. This is accomplished by the processor system 18 detecting the time duration of the ENC1 signals and deactivating the motor 10 drive signals W1–W4 until the next high to low transition of the ENC1 signal whenever the speed of the motor 10 exceeds two thousand one hundred ninety full steps per second.

A STOP signal on the lead 46 to the processor system 18 will cause the motor 10 to be stopped. This is accomplished by the processor system 18 changing the motor 10 drive signals W1–W4 to a lag angle of 3.75° and simultaneously activating the ZBYP signal. At every ensuing transition of the ENC1 signal the lag angle of the drive signals W1–W4 is set to 3.75°. When the motor 10 slows to the point where the time between a high to low and low to high transition (one half step of the motor 10) exceeds seven hundred fifty microseconds, bias damping is turned on to stop the motor 10 and the ERROR and ACK signals are activated. The STOP signal is sensed by the processor system 18 during any acceleration of the motor 10 except during the first four steps of the homing procedure or when the $\overline{\text{HIE}}$ signal is active.

Each time power is applied to the stepper motor 10 control system illustrated in FIG. 1, the stepper motor 10 must be homed to a mechanical reference position, as discussed above, so that the processor system 18 can keep track of the load 12 by keeping track of the steps moved by the motor 10. In order to home the motor 10, the user controls 20 must supply a HR signal together with information concerning the direction the motor 10 is to be driven from its current position by means of the DIR signal. The A/I signal has no effect on the system when the motor 10 is being homed. The system will also ignore any motion request MR signals supplied by the user until the motor is homed. Once the user has located the motor 10 to within 165° of motor 10 rotation of the desired home position, the user activates the $\overline{\text{HIE}}$ signal with the $\overline{\text{HI}}$ signal, that occurs once for each full rotation of the motor 10, indicates the location of the home position to the processor system 18.

When the homing procedure is first initiated, the processor system will step the motor 10 to position it to a known winding 162. As discussed above, this position occurs when the drive signal W1 is present and is applied to the motor 10 winding 162. If the DIR signal is low the motor 10 is stepped in a counter clockwise direction to position the disk 16 by sequentially energizing each of the winding drive signals W2, W3, W4, and W1 for sixteen milliseconds. If the DIR signal is high, the motor 10 is stepped in a clockwise direction to position the disk 16 by sequentially energizing each of the winding drive signals W4, W3, W2, and W1 for sixteen milliseconds. The motor 10 is driven to position the disk 16 at a rate of sixteen milliseconds per full steps after which the motor 10 is driven at an upper limit speed of one and seven tenths milliseconds per full step, or six hundred steps per second, until the $\overline{\text{HIE}}$ signal is activated by the user. The occurrence of the $\overline{\text{HIE}}$ signal causes the processor system 18 to activate the ZBYP signal and drive the motor forward at a rate of fourty six milliseconds per full step or substantially twenty two full steps per second until the $\overline{\text{HI}}$ signal becomes active due to the position of the disk 16 with regard to the light path 126. The simultaneous occurrence of the $\overline{\text{HIE}}$ and $\overline{\text{HI}}$ signals results in the motor 10 being stopped in the home position with the disk 16 in the position shown in FIG. 3 by application of bias damping and only the drive signal W1 remaining active. Once the motor 10 is stopped at the home position, bias damping is removed and the ACK signal becomes active. Once successfully homed, the motor 10 can be moved to any one of the possible two thousand fourty seven step positions by application of the proper user control signals MR, PIL0-PIL10, DIR and A/I.

The processor system 18 will respond only to a HR request signal and not to a MR request signal whenever power is turned on and the system resets but the homing procedure has not been carried out or when the homing procedure is not successfully completed after the HR signal is made active. A homing procedure is considered by the processor system 18 to be unsuccessful if the user supplied STOP signal becomes active before the motor 10 reaches the home position, the motor 10 moves more than twenty nine full steps after the $\overline{\text{HIE}}$ signal becomes active and the $\overline{\text{HI}}$ signal did not become active, the motor 10 becomes jammed, a half step takes longer than 20 milliseconds when $\overline{\text{HIE}}$ is inactive or a half step takes longer than one and thirty three hundredths of a second after the $\overline{\text{HIE}}$ signal becomes active and the home position is not reached. As will be apparent from the above, the user must insure, during the homing procedure, that the user supplied $\overline{\text{HIE}}$ signal is coincidental with the disk 16 generated $\overline{\text{HI}}$ signal when the motor 10 is in the home position.

The processor system 18 will monitor the motor 10 for a minimum predetermined speed of 25 full steps per second during any move except for the last full step of a move and except during the last steps of the homing procedure when the $\overline{\text{HIE}}$ signal is active but the $\overline{\text{HI}}$ signal does not become active. The total elapsed time during these last steps of the homing procedure when $\overline{\text{HIE}}$ only is active is limited to one and thirty three hundredths seconds after which the processor system 18 activates the drive signal W1 and causes the motor 10 to be stopped in accordance with the same procedure as described above when both the $\overline{\text{HIE}}$ and $\overline{\text{HI}}$ signals are active during the homing procedure. This will also cause the ERROR signal to be activated and the system will not respond to a MR signal until the homing procedure is successfully completed. During those moves when the motor 10 speed falls below the permissible low speed of twenty four full steps per second, the motor 10 will be stopped at the nearest energized single winding and the ZBYP, ERROR and ACK signals will be active.

The processor system 18 will generate the ACK signal whenever the motor 10 is stopped in response to a STOP signal, no change occurs in the state of the ENC1 signal for twenty milliseconds, or when the motor 10 reaches its final position. The ACK signal will remain low for ten milliseconds after the last full step of a move while motor 10 oscillations, if any, settle. The processor system 18 will generate the ERROR signal during a move when no change of state of the ENC1 pulse occurs for twenty milliseconds, when the STOP signal is activated, when the motor 10 rotates eight full steps past the midpoint during the midpoint temporary deceleration portion of a type III move, or when the motor 10 does not achieve the home position in twenty nine full steps after the $\overline{\text{HIE}}$ signal is activated during a homing procedure. The processor system 18 will generate the ZBYP signal whenever the motor 10 is being stopped or is stopped such as when the $\overline{\text{HIE}}$ signal is active during a homing procedure, a motion request or a homing procedure has been completed, the STOP signal is made active, the motor 10 is decelerated, during a type I move or when four full steps remain to the point of deceleration when a type III move is being made.

As will now be apparent from the description set forth hereinabove, each time power is applied to the stepper motor control system illustrated in FIG. 1, it is necessary to home the motor 10 to the mechanical reference position before the processor system 18 will accept a motion request MR signal from the user. Once homed and the motor 10 is stopped as evidenced by the ACK signal being active, the user may move the motor 10 load 12 to any one of the two thousand forty seven descrete positions by supplying a motion request MR signal, a direction DIR signal that indicates the desired direction of rotation of the motor 10, a plurality of position signals PIL0-PIL10 that identify the position the motor 10 is to be moved to, and an absolute/incremental signal A/I that indicates whether the position signals PIL0-PIL10 are an absolute address to which the motor 10 is to be moved or the number of steps the motor 10 is to be moved from the home position. Once the move has been completed, it is not always necessary to return the motor 10 to the home position before performing another move. For example when operating in the absolute mode, any number of successive absolute moves can be made without homing the motor 10 before each move. Also, when operating in the absolute mode, the mode of operation can be changed from absolute to incremental without returning the motor 10 to the home position. When operating in the incremental mode, any number of successive incremental moves may be made without returning the motor 10 to the home position. However, when operating in the incremental mode of operation, the mode of operation cannot be changed to the absolute mode without first returning the motor 10 to the home position. As long as power to the system has been uninterrupted, a user supplied home request HR signal will return the motor 10 to the home reference position from which a new move can be made. During any move, the motor 10 can be stopped by the occurrence of a user supplied STOP signal. Also, if the motor 10 jams or its speed is less than the predetermined low speed, the processor system 18 will automatically stop the motor 10. Generally, user generated motion signals are not accepted and/or have no effect on the system if they are made active while the motor 10 is in motion as evidenced by the ACK signal being low.

Each time a motion request is made, the processor system 18 will automatically check the number of steps in the move and will accelerate and decelerate the motor 10 in accordance with one of three types of motion procedures discussed above in detail. Type I moves are limited to motion requests of only a few steps and result in only a short duration of acceleration and deceleration being supplied to the motor 10. Type II moves occur when more than a few motor 10 steps are requested but less steps than required for a type III move. A type II move includes accelerating the motor 10 over a predetermined portion of the move followed by decelerating the motor 10 to a stop during the remaining portion of the move. Type III moves are involved when the number of steps in the move exceed a predetermined number. During a type III move the motor 10 is accelerated and then decelerated to a stop. Prior to being decelerated to a stop, however, the motor 10 is temporarily decelerated for a short period during which time the real time deceleration characteristics of the move are measured and the steps needed to decelerate the motor 10 to a stop are calculated as described in detail hereinabove. When the steps remaining in the move are equal to the calculated number of steps required to decelerate the motor 10 to a stop, the motor 10 is decelerated to a stop substantially in accordance with the calculated deceleration requirements. During any move the processor system 18 will prevent the motor 10 from exceeding a predetermined maximum angular velocity.

As discussed above, each complete ENC1 signal 128 (FIG. 4) corresponds to one complete step of the motor 10 and each half cycle of the ENC1 signal corresponds to a half step of the motor 10. As will be apparent to those skilled in the art, the motor 10 may effectively have twice the number of steps per complete revolution thereof as far as the processor system 18 is concerned, if each half cycle of the ENC1 signal is interpreted by the processor system 18 as a complete step of the motor 10. This would result in more accurate control of the motor 18 by the processor system 18.

Attached hereto and made part of this specification is a program listing of the computer program which was utilized with the system illustrated in FIG. 1 to obtain the results and operations discussed hereinabove. Programming instructions and characteristics of the MCS 6530 microprocessor 74 and I/O chip 72 are fully described in the "MCS Microcomputer Family Programming Manual" copyrighted 1976 by MOS Technology Inc., 950 Rittenhouse Road, Norristown, Pa. 19401 the contents of which are incorporated herein by reference. The format of the attached program listing is such that the far left column includes the program card number of the program statement. Going from left to right, this is followed by the address location for the program statement and then the computer 72 code for the program statement or instruction. The next column contains the program statement operation code in nemonic form and is followed by the operand and then additional program statement comments. In addition to the program listing, FIGS. 11-24 illustrate the attached program listing in the form of flow charts. The initial portion of the attached program listing is devoted to symbols used within the program together with their definition and addresses, if any, and are identified by program card numbers one through sixty eight. Various options and time constants are identified by program card numbers seventy through one hundred seven.

Figure 11:
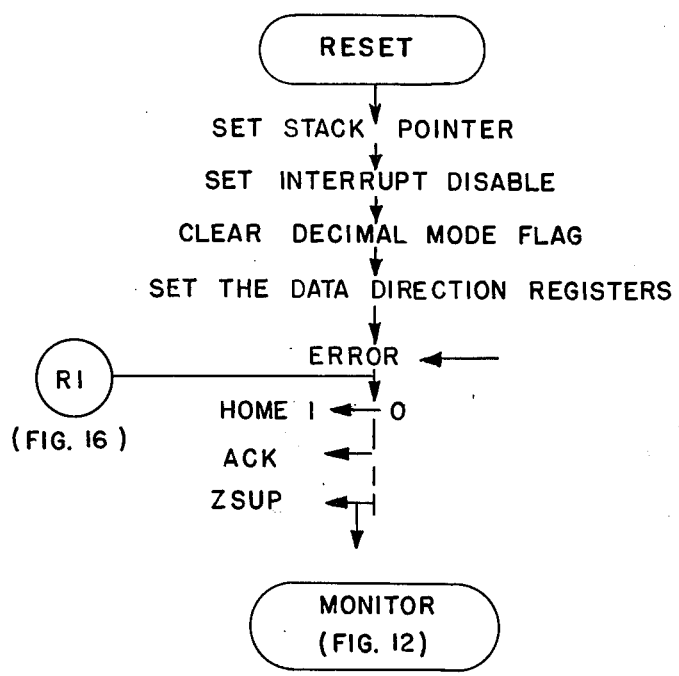
Figure 12:
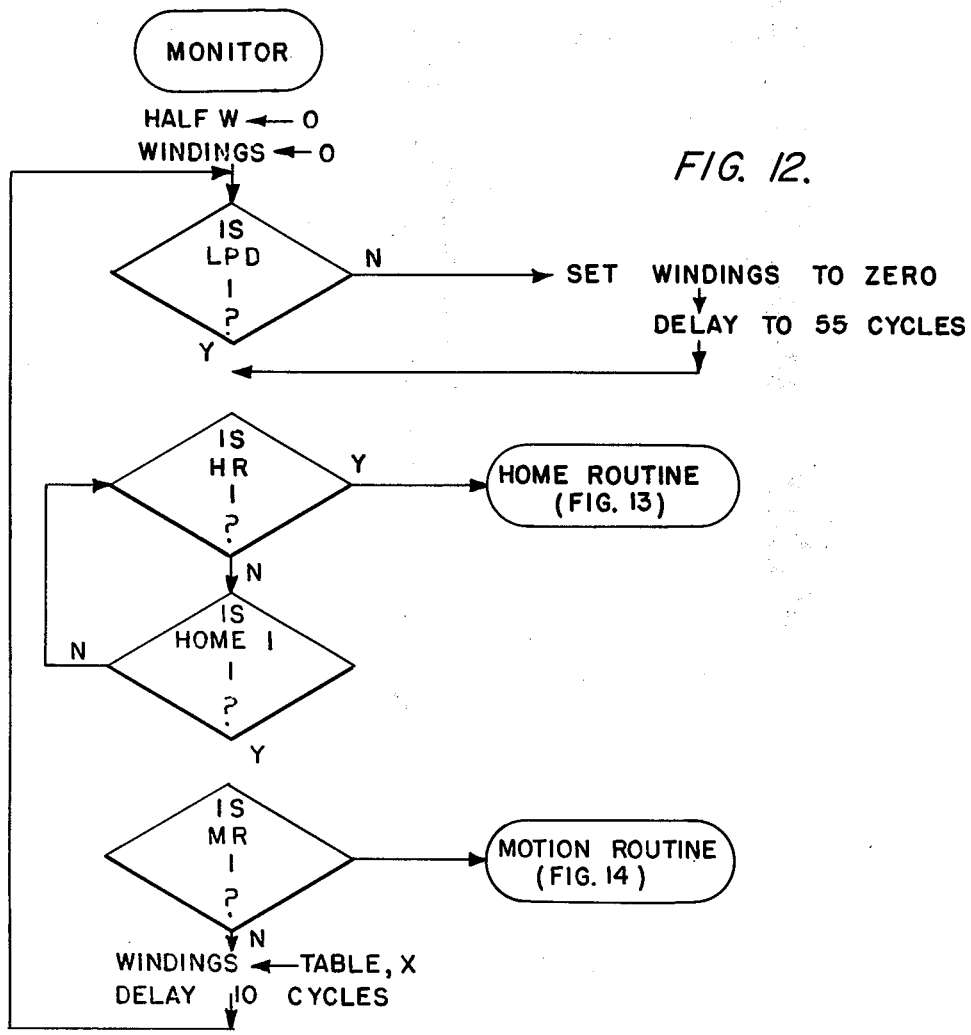
Figure 13:
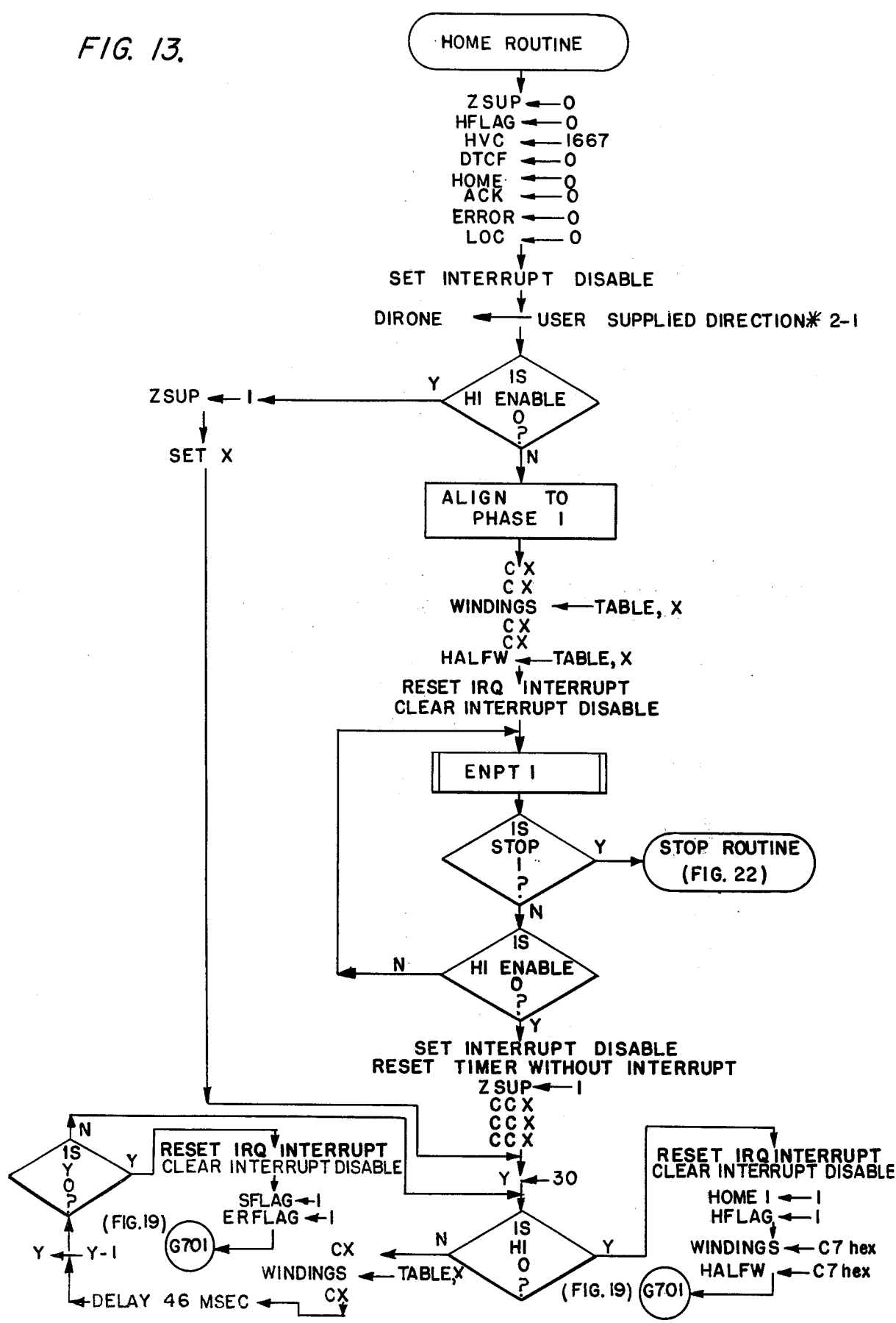
Figure 14:
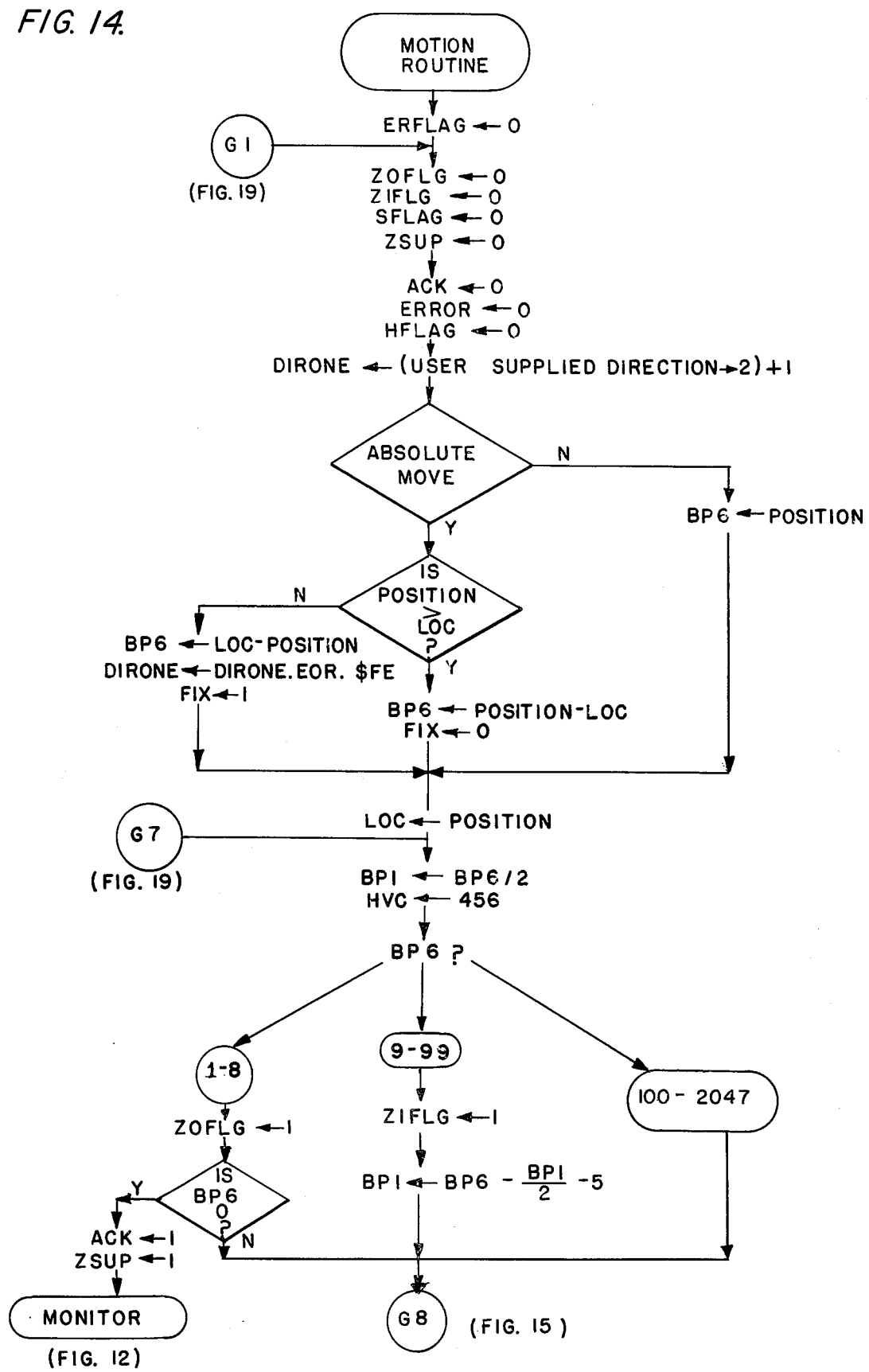
Figure 15:
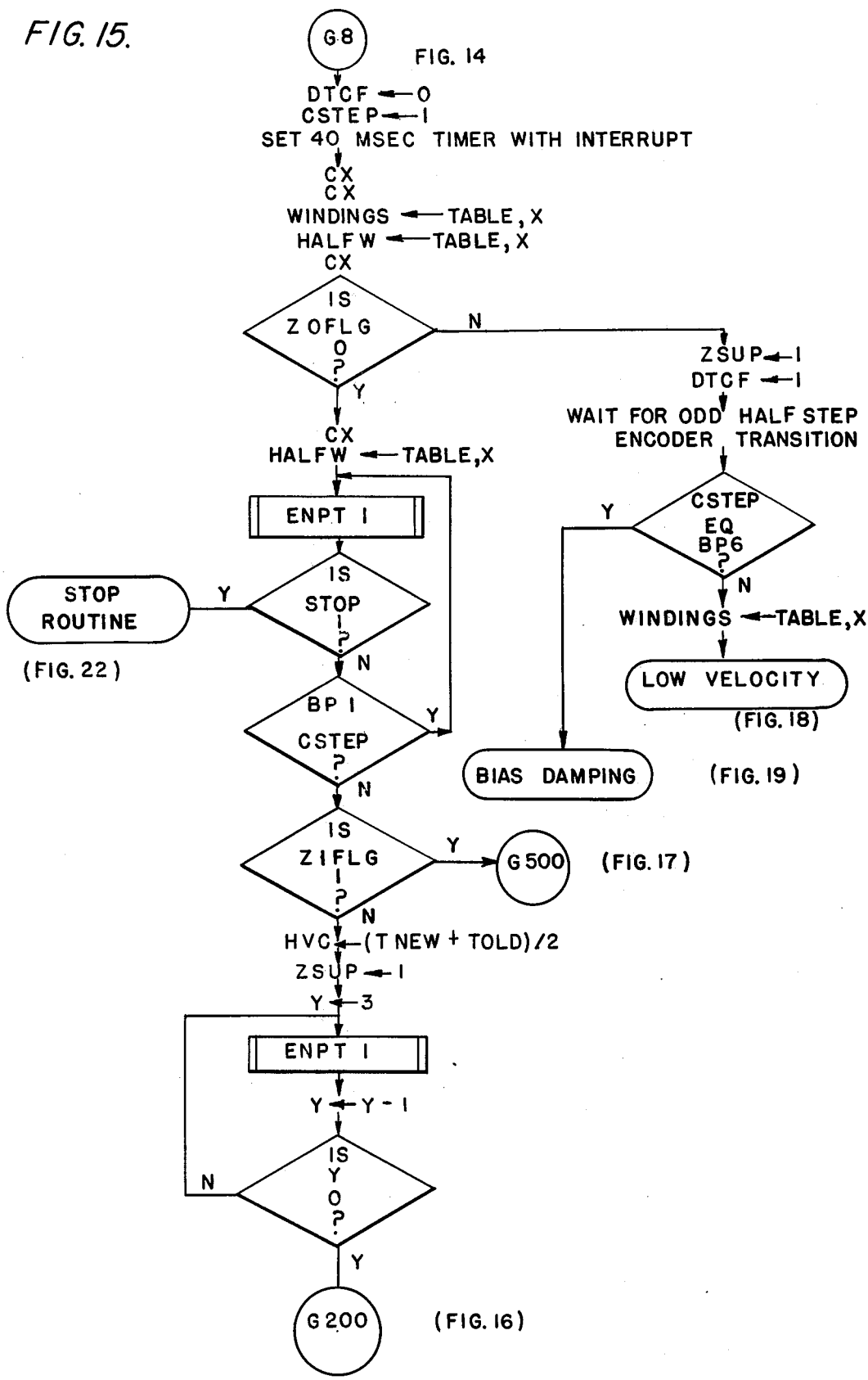
Figure 16:
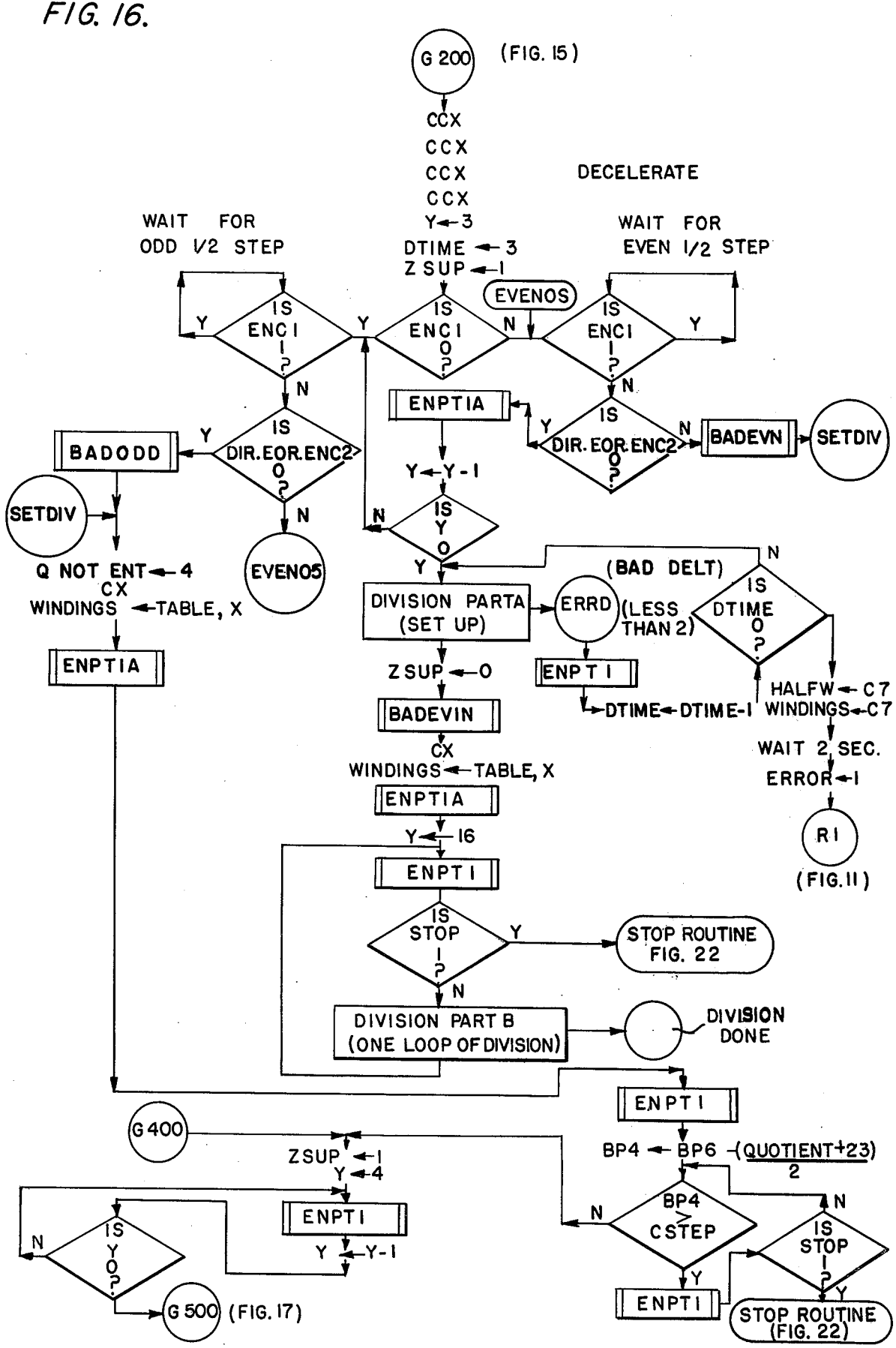
Figure 17:
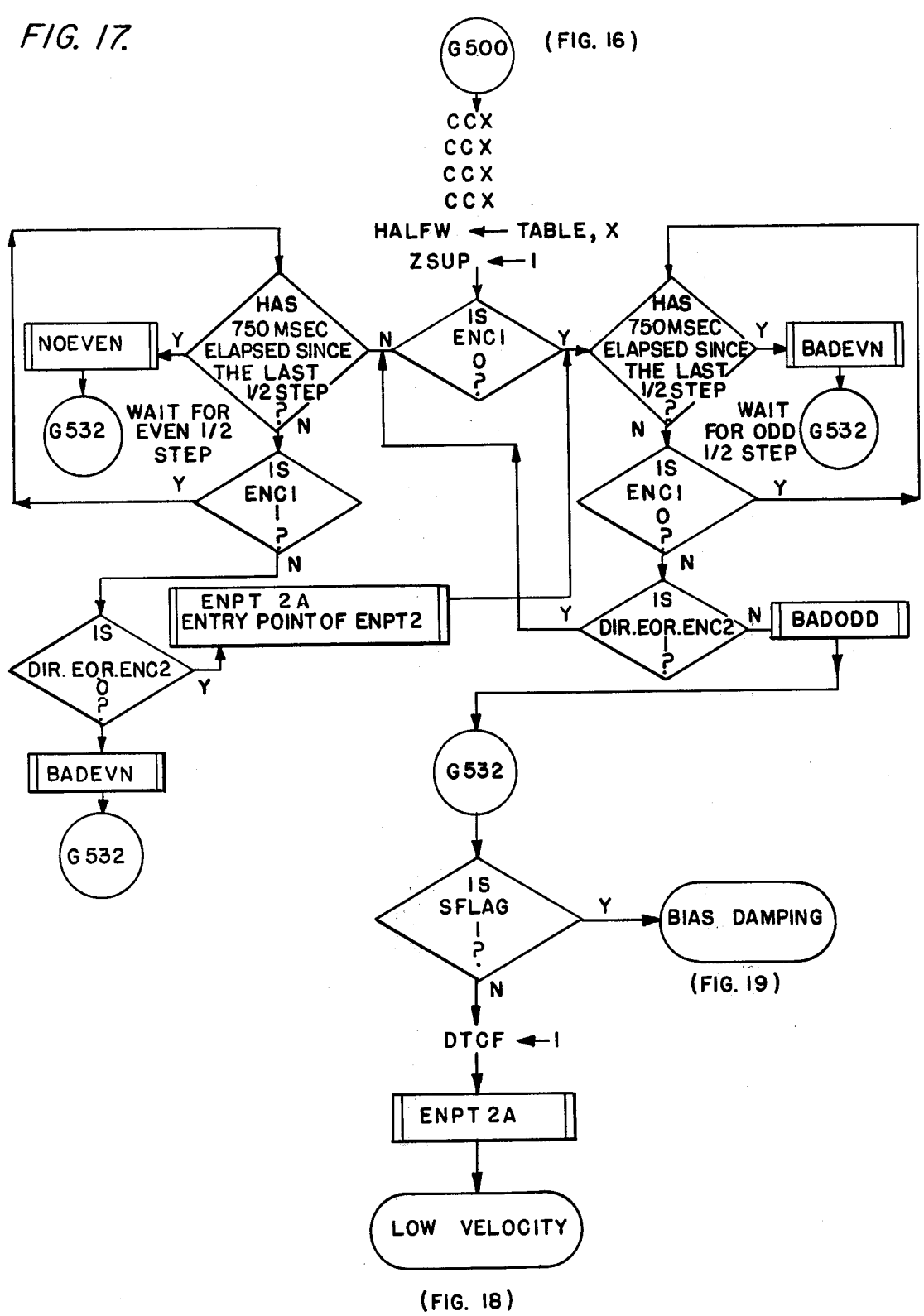
Figure 19:
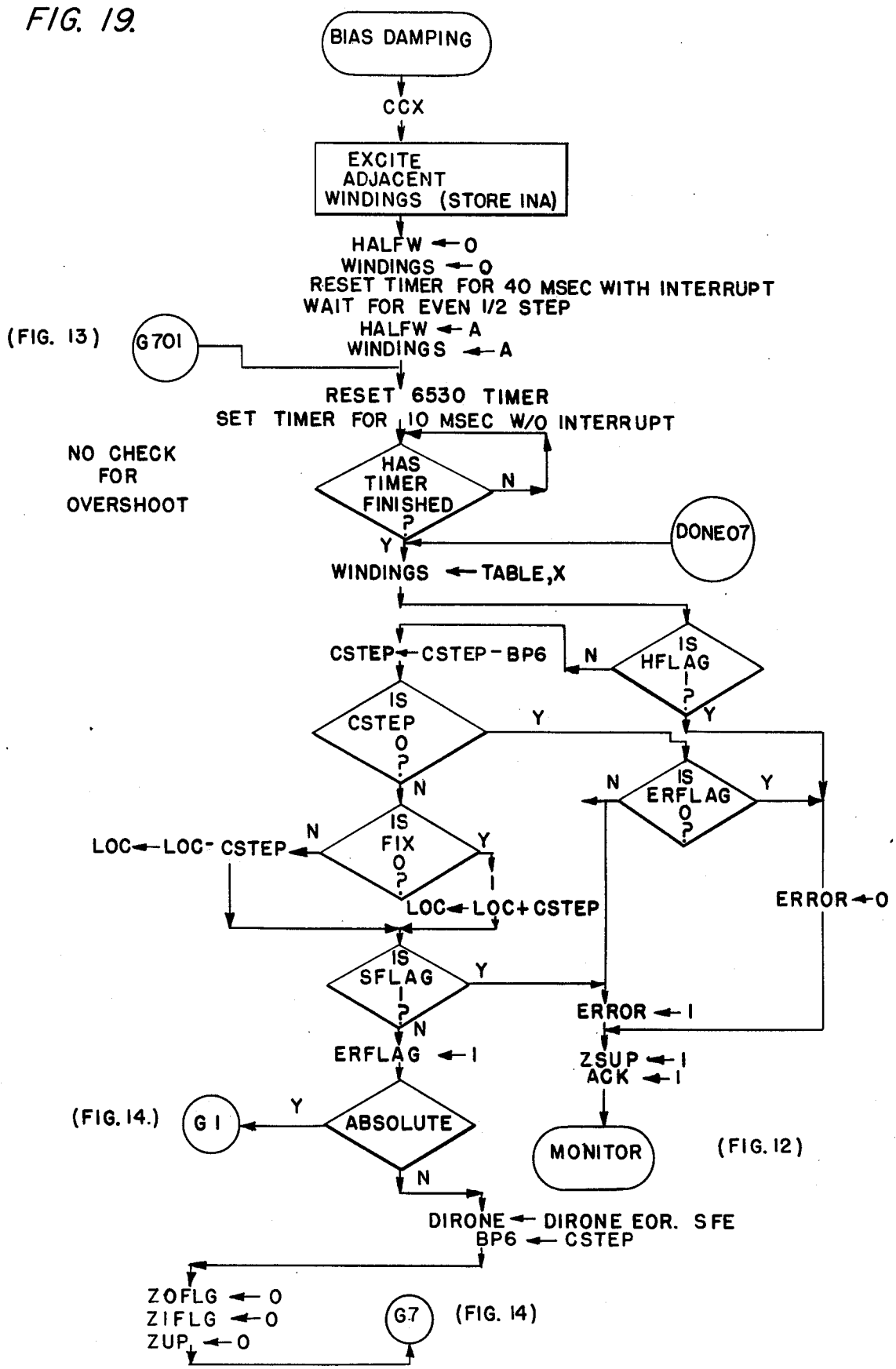
Figure 21:
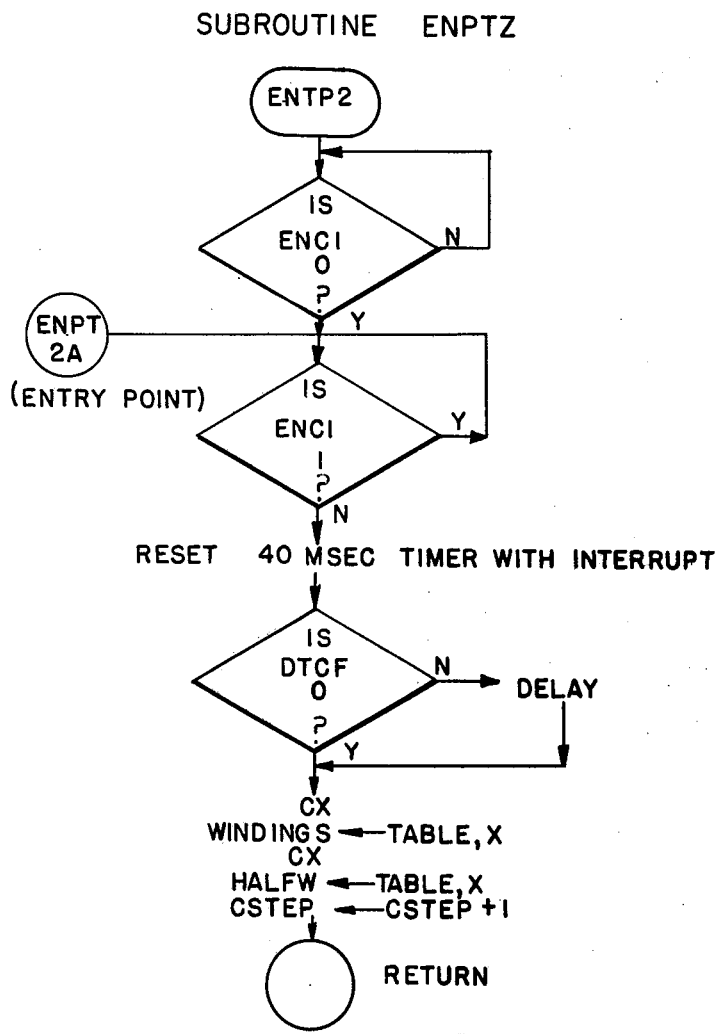
Figure 22:
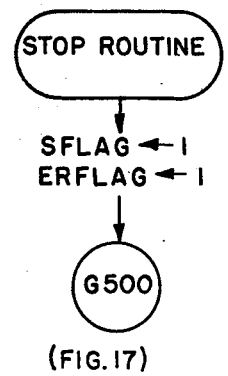
Figure 23:
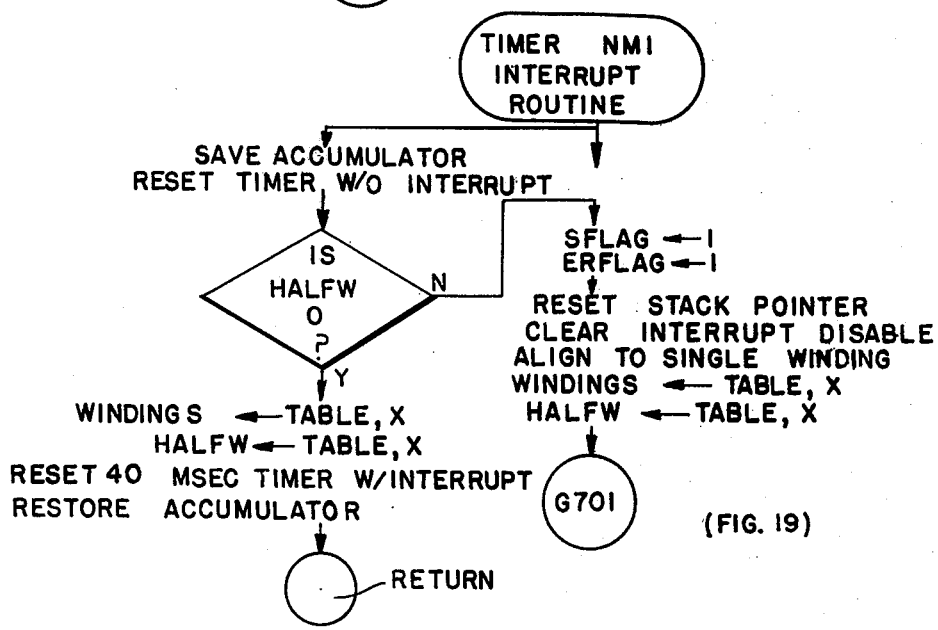

Once power to the system is turned on, it is necessary to set up all of the initial internal conditions within the system illustrated in FIG. 1. This routine is identified by program card numbers one hundred nine through one hundred thirty six in the the program listing and is illustrated in FIG. 11. Once power has been turned on and the system has been reset, the system will look for a home request HR signal if it has not yet been homed or a motion request MR signal it the system has been homed. This monitoring routine is identified in the program listing by program card numbers one hundred thirty eight through one hundred eighty and is illustrated in FIG. 12. Once power is turned on and a HR signal is activated, the system can be homed to the mechanical reference position. This routine is identified in the program listing by program card numbers one hundred eighty two through three hundred thirty one and is illustrated in FIG. 13. The motor 10 can be stopped, as described above, by the occurence of the user supplied STOP signal. This routine is identified in the program listing by program card numbers three hundred thirty three through three hundred thirty nine and is illustrated in FIG. 22. As discussed above, when the motor 10 is stopped in this manner, the system knows the location of the motor 10 and the load 12. When the motor is jammed or is unable to reach the predetermined minimum speed, the motor 10 will be automatically stopped by the processor system 18. This routine is identified in the program listing by program card numbers three hundred forty one through three hundred ninety three and is illustrated in FIG. 23. When the motor 10 is stopped in this manner, the system does not know the location of the motor 10 and the load 12 and the motor 10 must be returned to the home position before a motion request MR signal will be acted upon. Once the motor 10 has been homed and the MR signal is active, the motor 10 will be automatically moved in accordance with a type I, II or III move procedure. This routine is identified in the program listing by program card numbers three hundred ninety five through eight hundred ninety and is illustrated in FIGS. 14, 15, 16 and 17. The bias damping routine which is used to bring the motor 10 to a complete stop is identified in the program listing by program card numbers eight hundred ninety two through one thousand thirty nine and is illustrated in FIG. 19. When the motor is stopped a check is made to make certain that the motor 10 has not reversed direction. This routine is identified by program card numbers one thousand forty one through one thousand one hundred thirty and is illustrated in FIG. 24. The routine that prevents the motor 10 from exceeding the predetermined maximum speed is identified in the program listing by program card numbers one thousand thirty two through one thousand two hundred eighteen and is illustrated in FIG. 20. When being decelerated to a stop, the motor 10 speed is reduced until the time between any two ENC1 signal transitions exceeds 750 microseconds after which the motor 10 is automatically stopped during the next step. This routine is identified by the program card numbers one thousand two hundred twenty through two thousand two hundred eighty four and is illustrated in FIGS. 18 and 21. Program card numbers one thousand two hundred seventy six through one thousand three hundred three identify the motor 10 winding 162, 160, 158 and 156 commutation for clockwise and counterclockwise rotation. Program card numbers one thousand three hundred five through one thousand three hundred twelve identify the location of the interrupt vectors. The remainder of the program listing includes a table of the symbols used in the program.

Any deviation in the drawings or description contained herein from the system defined by the appended detailed program listing is inadvertent. Any such deviation or ambiguity is to be resolved by reference to the appended detailed program listing which is controlling as regards the operation of the apparatus of this invention.

```
36  00C3        BP4H     *=*+1
37  00C4        BP6L     *=*+1
38  00C5        BP6H     *=*+1
39  00C6        LOCL     *=*+1          CURRENT LOCATION
40  00C7        LOCH     *=*+1          CURRENT LOCATION
41  00C8        DL       *=*+1          DIVISION REGISTER
42  00C9        DH       *=*+1          DIVISION REGISTER
43  00CA        TOPL     *=*+1          NUMERATOR IN DIVISION
44  00CB        TOPH     *=*+1          NUMERATOR IN DIVISION
45  00CC        DELTL    *=*+1          T1-T0 (DENOMINATOR IN DIVISION)
46  00CD        DELTH    *=*+1          T1-T0 (DENOMINATOR IN DIVISION)
47  00CE        TNEWL    *=*+1          T1
48  00CF        TNEWH    *=*+1          T1
49  00D0        TOLDL    *=*+1          T0
50  00D1        TOLDH    *=*+1          T0
51  00D2        CSTEPL   *=*+1          STEP COUNTER
52  00D3        CSTEPH   *=*+1          STEP COUNTER
53  00D4        HVCL     *=*+1          HIGH VELOCITY COUNTER
54  00D5        HVCH     *=*+1          HIGH VELOCITY COUNTER
55  00D6        HFLAG    *=*+1          HOME FLAG
56  00D7        ZFLAG    *=*+1          ZONE FLAG
57  00D8        SFLAG    *=*+1          STOP REQUEST FLAG
58  00D9        EFLAG    *=*+1          ERROR FLAG
59  00DA        FIX      *=*+1
60  00DB        HALFW    *=*+1          ODD HALF STEP COMMUTATE WORD
61  00DC        ADJW     *=*+1          ADJACENT WINDINGS FOR BIAS DAMPING
62  00DD        DTC      *=*+1          DELAY TO COMMUTATE FLAG
63  00DE        STIME    *=*+1          SOFTWARE TIMER OR COUNTER
64  00DF        HOME1    *=*+1          SUCCESSFUL HOME FLAG
65  00E0        DIR      *=*+1          DIRECTION INDICATOR
66  00E1        DIRTWO   *=*+1          DIRONE*2
67  00E2        TEMPA    *=*+1          TEMPORARY SAVE A (IRQ)
68  00E3        NTEMPA   *=*+1          TEMPORARY SAVE A (NMI)
70  00E4        ;
71  00E4        ;OPTIONS
72  00E4        ;
73  00E4                 .OPT  CNT,XREF,MEM,LIST,NOERR,NOGEN
74  00E4
75  00E4        ;
76  00E4        ;   TIME CONSTANTS
77  00E4        ;   895 KHZ CLOCK ASSUMED (1.11732 MICROSEC CYCLE)
78  00E4        ;
79  00E4                 TOFF00=11          DELAY TIME FOR CHOPPING (OFF)
80  00E4                 TON00=2            DELAY TIME FOR CHOPPING (ON)
81  00E4        ;
82  00E4                 HOML03=$04         HIGH VELOCITY FOR HOMING (LSB)
83  00E4                 HOMH03=$05         HIGH VELOCITY FOR HOMING (MSB)
84  00E4        ;HVC FOR HOMING IS 1492 CYCLES (1667 MICROSEC)
85  00E4        ;
86  00E4                 MOVL04=$98         HIGH VELOCITY FOR MOTION (LSB)
87  00E4                 MOVH04=$01         HIGH VELOCITY FOR MOTION (MSB)
88  00E4        ;HVC FOR MOTION IS 408 CYCLES (456 MICROSEC)
89  00E4        ;
90  00E4                 MS10=9             10 MSEC TIME INTERVAL
91  00E4                 MS16=14            16 MSEC TIME INTERVAL
92  00E4                 MS40=35            40 MSEC TIME INTERVAL
93  00E4                 MS46=40            46 MSEC TIME INTERVAL
94  00E4                 MS125=109          125 MSEC TIME INTERVAL
95  00E4        ;
96  00E4                 DTCCON=42          DELAY TO COMMUTATE CONSTANT
97  00E4        ;DELAY IS DTCCON*8+27 CYCLES=400 MICROSEC
98  00E4        ;
99  00E4                 ELVC06=63          LOW VELOCITY CONSTANT (EVEN HALF STEP)
100 00E4        ;TIME IS ELVC06*10+4+34 CYCLES= 750 MICROSECONDS
101 00E4        ;
102 00E4                 OLVC06=59          LOW VELOCITY CONSTANT (ODD HALF STEP)
103 00E4        ;TIME IS OLVC06*10+4+76 CYCLES = 750 MICROSECONDS
104 00E4        ;
105 00E4
106 00E4                 DTCIRQ=67          DELAY TO COMMUTATE CONSTANT (ODD HALF)
107 00E4        ;DELAY IS DTCIRQ*5+24 CYCLES = 600 MICROSECONDS
108 00E4
109 00E4        ;   START OF PROM PROGRAM
110 00E4        ;   HIGH NIBBLE DOES NOT MATTER SINCE
111 00E4        ;   WE ARE USING THE 6503 WHICH ONLY HAS 12 ADDRESS LINES
112 00E4        ;
113 00E4
114 00E4                 *=$0A00
115 00E4
116 0A00
117 0A00        ;
118 0A00        ;RESET
119 0A00        ;
120 0A00        ;SET INITIAL CONDITIONS
121 0A00        ;
122 0A00
123 0A00 A2 FF  RESETV   LDX   #$FF
124 0A02 9A              TXS                SET STACK POINTER
125 0A03 78              SEI                SET INTERRUPT DISABLE
126 0A04 D8              CLD                CLEAR DECIMAL MODE FLAG
127 0A05 A9 55           LDA   #$55
128 0A07 85 81           STA   DDRWIN       SET DATA DIRECTION REGISTER A
129 0A09 A9 1C           LDA   #$1C
130 0A0B 85 83           STA   DDRIO        SET DATA DIRECTION REGISTER B
131 0A0D A9 00           LDA   #0           ERROR IS ZERO
132 0A0F 09 14  R1       ORA   #$14         SET ACK=1, ZSUP=1
133 0A11 85 82           STA   IOWORD
134 0A13 A9 00           LDA   #0
135 0A15 85 80           STA   WINDNG       SET WINDINGS TO ZERO
136 0A17 85 DF           STA   HOME1        SET HOME1 TO ZERO
138 0A19
139 0A19        ;
140 0A19        ;   OFF TIME=28+5*TOFF00   ON TIME=16+5*TON00
141 0A19        ;   FOR TON00=2 AND TOFF00=11, 24% AT 8.2KHZ
142 0A19
143 0A19 A9 00  MONITR   LDA   #0           MONITOR AND CHOPPING ROUTINE
144 0A1B 85 DB           STA   HALFW
145 0A1D 85 80           STA   WINDNG       INITIALLY TURN POWER OFF
146 0A1F A9 02  MONON    LDA   #2
147 0A21 24 80           BIT   WINDNG       TEST LPD
148 0A23 D0 09           BNE   LOOK00       IF LPD IS ONE, NO CHOP
149 0A25 A9 00           LDA   #0
150 0A27 85 80           STA   WINDNG       TURN OFF WINDINGS
151 0A29 A0 0B           LDY   #TOFF00
152 0A2B 88     OFFW00   DEY
153 0A2C D0 FD           BNE   OFFW00       DELAY 5*TOFF00 CYCLES
154 0A2E
155 0A2E        ;
156 0A2E        ;   LOOK FOR HOME REQUEST
157 0A2E
```

```
158  0A2E  A9 08      LOOK00   LDA   #$08
159  0A30  24 80               BIT   WINDNG       CHECK FOR HR
160  0A32  D0 1A               BNE   HOMER
161  0A34  A5 DF               LDA   HOME1        HAS THE MOTOR BEEN HOMED SINCE RESET?
162  0A36  F0 F6               BEQ   LOOK00       NO MOTION REQUEST UNTIL HR AFTER RESET
163  0A38
164  0A38
165  0A38           ; LOOK FOR MOTION REQUEST
166  0A38           ;
167  0A38  A9 20               LDA   #$20
168  0A3A  24 80               BIT   WINDNG
169  0A3C  F0 03               BEQ   NOMR00
170  0A3E  4C 4D 0B            JMP   MOVER        MOVE REQUESTED
171  0A41
172  0A41
173  0A41           ; TURN ON WINDING
174  0A41           ;
175  0A41  BD 00 0F  NOMR00   LDA   TABLE,X
176  0A44  85 80               STA   WINDNG       TURN ON WINDINGS
177  0A46  A0 02               LDY   #TON00
178  0A48  88        ONW00    DEY
179  0A49  D0 FD               BNE   ONW00        DELAY 5*TON00 CYCLES
180  0A4B  4C 1F 0A            JMP   MON00        JUMP TO MONITOR
181
182  0A4E
183  0A4E           ; HOMING ROUTINE
184  0A4E           ; ALL INTERNAL LABELS IN THIS SECTION END WITH '03'
185  0A4E           ;
186  0A4E
187  0A4E  A9 00     HOMER    LDA   #0
188  0A50  85 82               STA   IOWORD       SET ZSUP=0, SET ACK=0, SET ERROR=0
189  0A52  85 C7               STA   LOCH         SET LOC TO ZERO
190  0A54  85 C6               STA   LOCL
191  0A56  85 DF               STA   HOME1        SET HOME1 TO ZERO
192  0A58  85 D6               STA   HFLAG        SET HFLAG TO ZERO
193  0A5A  85 DD               STA   DTCF         SET DTCF TO ZERO
194  0A5C
195  0A5C
196  0A5C           ; SET HVC TO LIMIT MAX SPEED
197  0A5C           ;
198  0A5C  A9 05               LDA   #HOMH03
199  0A5E  85 D5               STA   HVCH
200  0A60  A9 04               LDA   #HOML03
201  0A62  85 D4               STA   HVCL
202  0A64  78                  SEI                SET INTERRUPT DISABLE
203  0A65
204  0A65
205  0A65           ; USE DIR TO SET DIRONE AND DIRTWO (OPPOSITE OF SETTING IN MR)
206  0A65           ;
207  0A65  A5 D2               LDA   DIR
208  0A67  30 04               BMI   SETD03
209  0A69  A9 FF               LDA   #$FF         SET DIRONE=$FF (DIR IS 0)
210  0A6B  D0 02               BNE   STRD03       JUMP TO STRD03 (RESULT IS NEVER 0)
211  0A6D  A9 01     SETD03   LDA   #$01         SET DIRONE=$01 (DIR IS 1)
212  0A6F  85 E0     STRD03   STA   DIRONE
213  0A71  0A                  ASL   A
214  0A72  85 E1               STA   DIRTWO
215  0A74
216  0A74
217  0A74           ; ARE WE NEAR HOME?
218  0A74           ;
219  0A74  A9 02               LDA   #2
220  0A76  24 82               BIT   IOWORD
221  0A78  D0 0A               BNE   ALIN03
222  0A7A  A9 04               LDA   #4
223  0A7C  85 82               STA   IOWORD       NEAR HOME, SET ZSUP TO 1 (ACK=0,ERROR=0)
224  0A7E  38                  SEC                NEAR HOME, SET X
225  0A7F  E5 E0               SBC   DIRONE
226  0A81  AA                  TAX
227  0A82  D0 4B               BNE   NEAR03       JUMP TO NEAR03 (RESULT IS NEVER 0)
228  0A84
229  0A84
230  0A84           ; SET X AND ALIGN TO W1 (NOT NEAR HOME)
231  0A84           ;
232  0A84  A5 E1     ALIN03   LDA   DIRTWO       NEAR HOME, SET X
233  0A86  29 07               AND   #$07
234  0A88  AA                  TAX
235  0A89  BD 00 0F            LDA   TABLE,X
236  0A8C  85 80     ALST03   STA   WINDNG       OUTPUT TO WINDINGS (START OF ALIGN LOOP)
237  0A8E  A0 0E               LDY   #MS16        16 MSEC TIME INTERVAL
238  0A90  84 87               STY   TIMEWO       SET TIMER W/O INTERRRUPT
239  0A92  A4 84     DLAY03   LDY   TIMERR
240  0A94  10 FC               BPL   DLAY03
241  0A96  2C A0 0A            BIT   MASK83
242  0A99  F0 06               BEQ   LEAD03       MASK83 IS $7C
                                                  IF RESULT IS 0, WE ARE AT W1
243  0A9B
244  0A9B
245  0A9B           ; COMMUTATE
246  0A9B           ;
247  0A9B  20 E5 0F            JSR   CXTWO        CX TWICE
248  0A9E  D0 EC               BNE   ALST03       JUMP TO ALST03 (RESULT IS NEVER 0)
249  0AA0  7C        MASK83   .BYTE $7C
250  0AA1
251  0AA1
252  0AA1           ; PHASE LEAD
253  0AA1           ;
254  0AA1  20 E5 0F  LEAD03   JSR   CXTWO        CX TWICE
255  0AA4  85 80               STA   WINDNG       OUTPUT TO WINDINGS
256  0AA6  20 E5 0F            JSR   CXTWO        CX TWICE
257  0AA9  85 D8               STA   HALFW
258  0AAB  85 00               STA   ZERO         WRITE TO ADDRESS 0 TO CLEAR IRQ
259  0AAD  58                  CLI
260  0AAE
261  0AAE
262  0AAE           ; MOVE MOTOR TOWARDS HOME WITH LEAD ANGLE
263  0AAE           ;
264  0AAE  20 3A 0F  HMOV03   JSR   ENPTI
265  0AB1  24 80               BIT   WINDNG       TEST FOR STOP REQUEST
266  0AB3  10 03               BPL   NOSP03
267  0AB5  4C 00 0B            JMP   STOP
268  0AB8  A9 02     NOSP03   LDA   #2           NO STOP REQUESTED
269  0ABA  24 82               BIT   IOWORD       IS HIE ZERO?
270  0ABC  D0 F0               BNE   HMOV03
271  0ABE  78                  SEI                HIE IS ZERO (NEAR HOME)
272  0ABF  A5 84               LDA   TIMERR       READ TIMER TO RESET W/O INTERRUPT
273  0AC1  A9 04               LDA   #4
274  0AC3  85 82               STA   IOWORD       SET ZSUP TO 1
275  0AC5
276  0AC5
277  0AC5           ; REMOVE PHASE LEAD
278  0AC5
```

```
279  0AC5  8A              TXA
280  0AC6  38              SEC
281  0AC7  E5 E1           SBC  DIRTWO      CCY TWICE
282  0AC9  38              SEC
283  0ACA  E5 E0           SBC  DIRONE      CCY
284  0ACC  29 07           AND  #$07
285  0ACE  AA              TAX
286  0ACF
287  0ACF
288  0ACF          ;  NEAR HOME
289  0ACF          ;
290  0ACF  A0 1E    NEAR03  LDY  #30
291  0AD1  A9 20    TEST03  LDA  #$20       TEST HI
292  0AD3  24 82            BIT  IOWORD
293  0AD5  D0 14            BNE  CLOS03
294  0AD7
295  0AD7          ;
296  0AD7          ;  HOME (HI IS 0)
297  0AD7          ;
298  0AD7  A9 80            LDA  #$80
299  0AD9  85 DF            STA  HOME1       SET HOME1 (HOME COMPLETE)
300  0ADB  85 D8            STA  HFLAG
301  0ADD  85 00            STA  ZERO        WRITE TO ADDRESS 0 TO RESET IRQ
302  0ADF  58               CLI
303  0AE0  A2 00            LDX  #0          W1 ON
304  0AE2  A9 C7            LDA  #$C7
305  0AE4  85 DB            STA  HALFW
306  0AE6  85 80            STA  WINDNG      OUTPUT TO WINDINGS
307  0AE8  4C 33 0E         JMP  G701
308  0AEB
309  0AEB          ;
310  0AEB          ;  NOT AT HOME YET  COMMUTATE AND OUTPUT WINDINGS
311  0AEB          ;
312  0AEB  20 F0 0F CLOS03  JSR  CXONE       CX
313  0AEE  BD 00 0F         LDA  TABLE,X
314  0AF1  85 80            STA  WINDNG      OUTPUT TO WINDINGS
315  0AF3  20 F0 0F         JSR  CXONE       CX
316  0AF6  A9 28            LDA  #MS46       46 MSEC TIME INTERVAL
317  0AF8  85 87            STA  TIMEWO      SET TIMER W/O INTERRUPT
318  0AFA  A5 84    DELY03  LDA  TIMERR
319  0AFC  10 FC            BPL  DELY03
320  0AFE  88               DEY                 DECREMENT Y
321  0AFF  D0 D0            BNE  TEST03
322  0B01
323  0B01          ;
324  0B01          ;  CAN'T FIND HOME (ERROR)
325  0B01          ;
326  0B01  85 00            STA  ZERO        WRITE TO ADDRESS 0 TO RESET IRQ
327  0B03  58               CLI
328  0B04  A9 80            LDA  #$80
329  0B06  85 D8            STA  SFLAG
330  0B08  85 D9            STA  ERFLAG
331  0B0A  4C 33 0E         JMP  G701
332  0B0D          ;
333  0B0D          ;  STOP REQUEST ROUTINE
334  0B0D          ;
335  0B0D
336  0B0D  A9 80    STOP    LDA  #$80
337  0B0F  85 D8            STA  SFLAG       SET STOP FLAG
338  0B11  85 D9            STA  ERFLAG      SET ERROR FLAG
339  0B13  4C AD 0D         JMP  G500        DECELERATE
340  0B16
341  0B16          ;
342  0B16          ;  NMI INTERRUPT ROUTINE (UNEXPECTED MOTOR STOP)
343  0B16          ;  ALL INTERNAL LABELS IN THIS SECTION END WITH "99"
344  0B16          ;
345  0B16          ;  READ TIMER TO DISABLE TIMER INTERRUPT
346  0B16
347  0B16  85 E3    NMIV    STA  NTEMPA      TEMPORARY SAVE A
348  0B18  A5 84            LDA  TIMERR
349  0B1A          ;
350  0B1A          ;
351  0B1A          ;  CHECK IF MOTOR STOP DUE TO HIGH FRICTION AND LOW INERTIA
352  0B1A          ;
353  0B1A  A5 DB            LDA  HALFW
354  0B1C  F0 21            BEQ  SLOW99
355  0B1E
356  0B1E          ;
357  0B1E          ;  STOP NOT DUE TO HIGH FRICTION AND LOW INERTIA
358  0B1E          ;
359  0B1E  A9 80            LDA  #$80
360  0B20  85 D8            STA  SFLAG       SET SFLAG
361  0B22  85 D9            STA  ERFLAG      SET ERFLAG
362  0B24  8A               TXA                 TEMPORARY SAVE X
363  0B25  A2 FF            LDX  #$FF
364  0B27  9A               TXS                 RESET STACK
365  0B28  AA               TAX                 RESTORE X
366  0B29  58               CLI                 CLEAR INTERRUPT DISABLE
367  0B2A
368  0B2A          ;
369  0B2A          ;  ALIGN X TO A SINGLE WINDING
370  0B2A          ;
371  0B2A  8A               TXA
372  0B2B  24 E0            BIT  DIRONE
373  0B2D  10 03            BPL  COM99
374  0B2F  18               CLC
375  0B30  69 01            ADC  #1
376  0B32  29 06    COM99   AND  #$06
377  0B34  AA               TAX
378  0B35  BD 00 0F         LDA  TABLE,X
379  0B38  85 DB            STA  HALFW
380  0B3A  85 80            STA  WINDNG      OUTPUT TO WINDINGS
381  0B3C  4C 33 0E         JMP  G701
382  0B3F
383  0B3F          ;
384  0B3F          ;  STOP DUE TO HIGH FRICTION AND LOW INERTIA
385  0B3F          ;
386  0B3F  BD 00 0F SLOW99  LDA  TABLE,X     START MOTOR MOVING AGAIN
387  0B42  85 80            STA  WINDNG
388  0B44  85 DB            STA  HALFW
389  0B46  A9 23            LDA  #MS40       40 MSEC TIME INTERVAL (RESET TIMER)
390  0B48  85 8F            STA  TIMERW      SET TIMER WITH INTERRUPT
391  0B4A  A5 E3            LDA  NTEMPA      RESTORE A
392  0B4C  40               RTI
393  0B4D
394  0B4D          ;  MOTION ROUTINE
395  0B4D          ;  ALL INTERNAL LABELS IN THIS SECTION END WITH "04"
396  0B4D          ;
```

```
400  0B4D                          ; SET INITIAL VALUES
401  0B4D                          ;
402  0B4D  A9 00      MOVER   LDA  #0
403  0B4F  85 D9              STA  ERFLAG           SET ERFLAG TO 0
404  0B51  A9 00      G1      LDA  #0
405  0B53  85 D7              STA  ZFLAG            SET ZOFLAG AND ZIFLAG TO 0
406  0B55  85 D8              STA  SFLAG            SFLAG = 0
407  0B57  85 D6              STA  HFLAG            HFLAG = 0
408  0B59  85 82              STA  IOWORD           SET ZSUP = 0, ACK = 0, ERROR = 0
409  0B5B  A5 02              LDA  POSH             READ POSITION H
410  0B5D  0A                 ASL  A                MOVE DIR TO CARRY
411  0B5E  A8                 TAY                   TEMPORARY SAVE IN Y
412  0B5F  A9 FF              LDA  #$FF
413  0B61  B0 02              BCS  ONE04            DIR=1, DIRONE=$FF
414  0B63  69 02              ADC  #2               DIR=0, DIRONE=$01
415  0B65  85 E0      ONE04   STA  DIRONE
416  0B67  0A                 ASL  A
417  0B68  85 E1              STA  DIRTWO           DIRTWO=DIRONE*2
418  0B6A  98                 TYA
419  0B6B  4A                 LSR  A
420  0B6C  A8                 TAY                   Y IS POSH (W/O DIR)
421  0B6D  A9 01              LDA  #1
422  0B6F  24 82              BIT  IOWORD           ABSOLUTE?
423  0B71  D0 09              BNE  ABS04
424  0B73  84 C5              STY  BP6H             INCREMENTAL MOVE  SAVE POSITION IN BP6
425  0B75  A5 01              LDA  POSL
426  0B77  85 C4              STA  BP6L
427  0B79  4C AE 0B           JMP  SETP04
428  0B7C  38         ABS04   SEC                   ABSOLUTE MOVE
429  0B7D  A5 01              LDA  POSL             PUT POSL IN A
430  0B7F  E5 C6              SBC  LOCL
431  0B81  85 C4              STA  BP6L
432  0B83  98                 TYA                   PUT POSH IN A
433  0B84  E5 C7              SBC  LOCH
434  0B86  85 C5              STA  BP6H
435  0B88  A5 C7              LDA  LOCH             WAS LOC NEG?
436  0B8A  30 02              BMI  LOCNEG
437  0B8C  90 06              BCC  CUMP04
438  0B8E  A9 00      LOCNEG  LDA  #0               POSITION - LOC IS POSITIVE
439  0B90  85 DA              STA  FIX
440  0B92  F0 1A              BEQ  SETP04           JUMP TO SETP04 (RESULT IS 0)
441  0B94  38         CUMP04  SEC                   POSITION - LOC IS NEG
442  0B95  A9 00              LDA  #0               PUT - RESULT IN BP6
443  0B97  E5 C4              SBC  BP6L
444  0B99  85 C4              STA  BP6L
445  0B9B  A9 00              LDA  #0
446  0B9D  E5 C5              SBC  BP6H
447  0B9F  85 C5              STA  BP6H
448  0BA1  A5 E0              LDA  DIRONE
449  0BA3  49 FE              EOR  #$FE             CHANGE DIRECTION
450  0BA5  85 E0              STA  DIRONE
451  0BA7  0A                 ASL  A
452  0BA8  85 E1              STA  DIRTWO
453  0BAA  A9 80              LDA  #$80
454  0BAC  85 DA              STA  FIX              FIX IS 1
455  0BAE  84 C7      SETP04  STY  LOCH             SAVE POSITION IN LOC
456  0BB0  A5 01              LDA  POSL
457  0BB2  85 C6              STA  LOCL
458  0BB4                     ;
459  0BB4                     ;
460  0BB4                     ; DETERMINE BP1
461  0BB4                     ;
462  0BB4  A5 C5      G7      LDA  BP6H             BP1 = BP6/2
463  0BB6  4A                 LSR  A
464  0BB7  85 C1              STA  BP1H             BP1 = MIDDLE OF MOVE
465  0BB9  A5 C4              LDA  BP6L
466  0BBB  6A                 ROR  A
467  0BBC  85 C0              STA  BP1L
468  0BBE                     ;
469  0BBE                     ;
470  0BBE                     ; SET HIGH VELOCITY CONSTANT
471  0BBE                     ;
472  0BBE  A9 01              LDA  #MOVH04
473  0BC0  85 05              STA  HVCH
474  0BC2  A9 98              LDA  #MOVL04
475  0BC4  85 04              STA  HVCL
476  0BC6                     ;
477  0BC6                     ;
478  0BC6                     ; TEST BP6 (MOVE SIZE) TO DETERMINE ZONE OF OPERATION
479  0BC6                     ;
480  0BC6  A5 C5              LDA  BP6H
481  0BC8  D0 2E              BNE  STRT04           MOVE GT 255
482  0BCA  A5 C4              LDA  BP6L
483  0BCC  C9 64              CMP  #100             COMPARE BP6 TO 100
484  0BCE  B0 28              BCS  STRT04           BP6 GE 100
485  0BD0  C9 09              CMP  #9               COMPARE BP6 TO 9
486  0BD2  90 15              BCC  SMAL04           BP6 LT 9
487  0BD4  A9 40              LDA  #$40             BP6 GE 9 AND LE 99
488  0BD6  85 D7              STA  ZFLAG            SET ZIFLAG = 1
489  0BD8                     ;
490  0BD8                     ;
491  0BD8                     ; SET BP1 = BP6-BP1/2-5 (SLIGHTLY LT 3/4 BP6)
492  0BD8                     ;
493  0BD8  A5 C0              LDA  BP1L             (BP1H AND BP6H ARE 0, SINCE LT 100)
494  0BDA  4A                 LSR  A                BP1/2
495  0BDB  18                 CLC
496  0BDC  69 05              ADC  #5
497  0BDE  85 C0              STA  BP1L
498  0BE0  38                 SEC
499  0BE1  A5 C4              LDA  BP6L
500  0BE3  E5 C0              SBC  BP1L
501  0BE5  85 C0              STA  BP1L             BP1 = BP6-BP1/2-5
502  0BE7  D0 0F              BNE  STRT04           JUMP TO STRT04 (RESULT IS NEVER 0)
503  0BE9                     ;
504  0BE9                     ;
505  0BE9  A9 80      SMAL04  LDA  #$80
506  0BEB  85 D7              STA  ZFLAG            BP6 LT 9
507  0BED  A5 C4              LDA  BP6L             SET ZOFLG = 1
508  0BEF  D0 07              BNE  STRT04           TEST BP6 FOR 0
509  0BF1  A9 14              LDA  #$14             BP6 = 0, NO MOVE  SET ACK = 1, ZSUP = 1
510  0BF3  85 82              STA  IOWORD
511  0BF5  4C 19 0A           JMP  MONITR
512  0BF8                     ;
513  0BF8                     ;
514  0BF8                     ; START MOVE
515  0BF8                     ;
516  0BF8  A9 00      STRT04  LDA  #0
517  0BFA  85 DD              STA  DTCF             CLEAR DTCF
```

```
518  0BFC  85 03            STA   CSTEPH        SET CSTEP TO 1
519  0BFE  A9 01            LDA   #1
520  0C00  85 02            STA   CSTEPL
521  0C02  A9 23            LDA   #MS40         40 MSEC TIME INTERVAL
522  0C04  85 6F            STA   TIMERW        SET TIMER WITH INTERRUPT
523  0C06
524  0C06
525  0C06          ; COMMUTATE
526  0C06
527  0C06  20 E5 0F         JSR   CXTWO         CX TWICE
528  0C09  85 80            STA   WINDNG        OUTPUT TO WINDINGS
529  0C0B  85 DB            STA   HALFW
530  0C0D  20 F0 0F         JSR   CXONE         CX
531  0C10  24 D7            BIT   ZFLAG         TEST Z0FLG
532  0C12  30 24            BMI   TYPE1         Z0FLG=1 (TYPE 1 MOVE)
533  0C14  20 F0 0F         JSR   CXONE         CX  (TYPE 2 OR 3)
534  0C17  BD DD 0F         LDA   TABLE,X
535  0C1A
536  0C1A          ; MOVE GREATER THAN EIGHT
537  0C1A
538  0C1A
539  0C1A  85 DB    TYPE23  STA   HALFW
540  0C1C  20 3A 0F LOOP04  JSR   ENPT1
541  0C1F  24 80            BIT   WINDNG
542  0C21  10 03            BPL   NOSP04        TEST FOR STOP
543  0C23  4C 0D 0B         JMP   STOP          STOP REQUESTED
544  0C26
545  0C26
546  0C26          ; TEST TO SEE IF BP1 GT CSTEP
547  0C26
548  0C26  38       NOSP04  SEC
549  0C27  A5 02            LDA   CSTEPL
550  0C29  E5 C0            SBC   BP1L
551  0C2B  A5 03            LDA   CSTEPH
552  0C2D  E5 C1            SBC   BP1H
553  0C2F  90 EB            BCC   LOOP04        BP1 GT CSTEP
554  0C31
555  0C31
556  0C31          ; MOTOR HAS REACHED BP1
557  0C31
558  0C31  24 07            BIT   ZFLAG         TEST Z1FLG
559  0C33  50 31            BVC   TYPE3
560  0C35  4C AD 0D         JMP   G500          TYPE 2 MOVE
561  0C38
562  0C38
563  0C38          ; TYPE 1 MOVE
564  0C38
565  0C38  A9 04    TYPE1   LDA   #4
566  0C3A  85 82            STA   IOWORD        SET ZSUP=1 (ACK=0,ERROR=0)
567  0C3C  A9 80            LDA   #$80
568  0C3E  85 DD            STA   DTCF          SET DTCF
569  0C40  24 05    ODD04   BIT   ENCODE
570  0C42  10 FC            BPL   ODD04         WAIT FOR ODD HALF STEP
571  0C44
572  0C44
573  0C44          ; DOES CSTEP = BP6?
574  0C44
575  0C44  A5 02            LDA   CSTEPL        NOT NECESSARY TO CHECK BP6H (BP6 LT 9)
576  0C46  C5 C4            CMP   BP6L
577  0C48  D0 03            BNE   STOR04
578  0C4A  4C FF 0D         JMP   BIASD         JUMP TO BIAS DAMPING (SINGLE STEP MOVE)
579  0C4D  BD DD 0F STOR04  LDA   TABLE,X
580  0C50  85 80            STA   WINDNG        OUTPUT W TO WINDINGS
581  0C52
582  0C52
583  0C52          ; LOW VELOCITY MOVE
584  0C52
585  0C52
586  0C52          ; IS BP6 GT CSTEP?
587  0C52
588  0C52  38       LOWV    SEC
589  0C53  A5 02            LDA   CSTEPL
590  0C55  E5 C4            SBC   BP6L
591  0C57  A5 03            LDA   CSTEPH
592  0C59  E5 C5            SBC   BP6H
593  0C5B  90 03            BCC   NBIA04
594  0C5D  4C FF 0D         JMP   BIASD         JUMP TO BIAS DAMPING
595  0C60  20 9F 0F NBIA04  JSR   ENPT2
596  0C63  4C 52 0C         JMP   LOWV
597  0C66
598  0C66
599  0C66          ; TYPE 3 MOVE
600  0C66
601  0C66  18       TYPE3   CLC
602  0C67  A5 CE            LDA   TNEWL         HVC = (TNEW+TOLD)/2
603  0C69  65 D0            ADC   TOLDL
604  0C6B  85 D4            STA   HVCL
605  0C6D  A5 CF            LDA   TNEWH
606  0C6F  65 D1            ADC   TOLDH
607  0C71  4A               LSR   A
608  0C72  85 D5            STA   HVCH
609  0C74  66 D4            ROR   HVCL
610  0C76  A0 03            LDY   #3
611  0C78  A9 04            LDA   #4
612  0C7A  85 82            STA   IOWORD        SET ZSUP = 1 (ACK = 0, ERROR = 0)
613  0C7C  20 3A 0F WAIT04  JSR   ENPT1         APPLY ZSUP
614  0C7F  88               DEY
615  0C80  D0 FA            BNE   WAIT04
616  0C82
617  0C82
618  0C82          ; MIDDLE OF TYPE 3 MOVE
619  0C82          ; ALL INTERNAL LABELS IN THIS SECTION END WITH "05"
620  0C82
621  0C82  8A       G200    TXA
622  0C83
623  0C83
624  0C83          ; DECELERATE 22 1/2 DEGREES
625  0C83
626  0C83  18               CLC
627  0C84  69 04            ADC   #4            CCX FOUR TIMES
628  0C86  29 07            AND   #$07
629  0C88  AA               TAX
630  0C89
631  0C89
632  0C89  A9 00            LDA   #0            SETUP FOR DIVISION (ZERO DIVISION REG)
633  0C8B  85 C8            STA   DL
634  0C8D  85 C9            STA   DH
635  0C8F  A0 03            LDY   #3            SET COUNTER TO 3
636  0C91                                       ; ZSUP IS ON FOR 4 STEPS BEFORE
```

```
637  0C91                                                    ; THE MOTOR STARTS TO DECELERATE
638  0C91   84 DE                STY     DTIME               DTIME COUNTS THE NUMBER OF TRIES TO
639  0C93                                                    ;CALCULATE DELT
640  0C93   A9 04                LDA     #4
641  0C95   85 82                STA     IOWORD              SET ZSUP TO 1 (ACK = 0, ERROR = 0)
642  0C97
643  0C97                      ;
644  0C97                      ; TEST DECELERATION
645  0C97                      ;
646  0C97   24 05                BIT     ENCODE
647  0C99   10 10                BPL     ODD05
648  0C9B   A5 05     EVEN05     LDA     ENCODE
649  0C9D   30 FC                BMI     EVEN05              HAS AN EVEN HALF STEP OCCURRED YET?
650  0C9F   45 E0                EOR     DIRONE
651  0CA1   29 40                AND     #$40
652  0CA3   D0 2D                BNE     NGEVEN              WRONG DIRECTION
653  0CA5   20 3E 0F             JSR     ENPT1A              ENTRY POINT IN ENPT1
654  0CA8   88                   DEY
655  0CA9   F0 2D                BEQ     DIVA05
656  0CAB   A5 05     ODD05      LDA     ENCODE
657  0CAD   10 FC                BPL     ODD05               HAS AN ODD HALF STEP OCCURRED YET?
658  0CAF   45 E0                EOR     DIRONE
659  0CB1   29 40                AND     #$40
660  0CB3   D0 E6                BNE     EVEN05
661  0CB5   20 B2 0E             JSR     BADODD              WRONG DIRECTION
662  0CB8
663  0CB8                      ;
664  0CB8                      ; MOTOR WENT IN THE WRONG DIRECTION
665  0CB8                      ; BYPASS DIVISION AND SET RESULT TO 4
666  0CB8                      ;
667  0CB8   A9 04     SETDIV     LDA     #4                  SET RESULT OF DIVISION TO 2 STEPS
668  0CBA   85 CA                STA     TOPL
669  0CBC   A9 00                LDA     #0
670  0CBE   85 CB                STA     TOPH
671  0CC0   8A                   TXA
672  0CC1   18                   CLC
673  0CC2   65 E0                ADC     DIRONE              CX
674  0CC4   29 07                AND     #$07
675  0CC6   AA                   TAX
676  0CC7   BD DD 0F             LDA     TABLE,X
677  0CCA   85 80                STA     WINDNG              OUTPUT TO WINDINGS
678  0CCC   20 3E 0F             JSR     ENPT1A
679  0CCF   4C 6B 0D             JMP     DONE05
680  0CD2   20 CE 0E  NGEVEN     JSR     BADEVN
681  0CD5   4C B8 0C             JMP     SETDIV
682  0CD8
683  0CD8                      ;
684  0CD8                      ; SETUP FOR DIVISION
685  0CD8                      ;
686  0CD8   38        DIVA05     SEC
687  0CD9   A5 CE                LDA     TNEWL
688  0CDB   85 CA                STA     TOPL
689  0CDD   E5 D0                SBC     TOLDL
690  0CDF   85 CC                STA     DELTL               TNEW IS TOP (NUMERATOR)
691  0CE1   A5 CF                LDA     TNEWH               STORE TNEW - TOLD IN DELT
692  0CE3   85 CB                STA     TOPH
693  0CE5   E5 D1                SBC     TOLDH
694  0CE7   85 CD                STA     DELTH
695  0CE9   90 61                BCC     ERRD05              DELT IS DIVISOR
696  0CEB   D0 06                BNE     OK05                ERROR IF DELT IS NEGATIVE
697  0CED   A5 CC                LDA     DELTL
698  0CEF   C9 02                CMP     #2
699  0CF1   90 59                BCC     ERRD05              ERROR IF DELT IS LESS THAN 2
700  0CF3
701  0CF3                      ;
702  0CF3                      ; RESUME ACCELERATION
703  0CF3                      ;
704  0CF3   A9 00     OK05       LDA     #0
705  0CF5   85 82                STA     IOWORD              SET ZSUP TO 0 (ACK = 0, ERROR = 0)
706  0CF7   20 CE 0E             JSR     BADEVN              RESUME ACCELERATION AND CHECK DIRECTION
707  0CFA   8A                   TXA
708  0CFB   18                   CLC
709  0CFC   65 E0                ADC     DIRONE              CX
710  0CFE   29 07                AND     #$07
711  0D00   AA                   TAX
712  0D01   BD DD 0F             LDA     TABLE,X
713  0D04   85 80                STA     WINDNG
714  0D06   20 3E 0F             JSR     ENPT1A
715  0D09   A0 10                LDY     #16                 SET DIGIT COUNTER TO 16
716  0D0B   D0 03                BNE     CLERB5              JUMP TO CLERB5 (RESULT IS NEVER 0)
717  0D0D   20 3A 0F  CLER05     JSR     ENPT1
718  0D10   18        CLERB5     CLC
719  0D11   24 80                BIT     WINDNG
720  0D13   10 03                BPL     NOSP05              TEST FOR STOP REQUEST
721  0D15   4C 0D 0B             JMP     STOP
722  0D18
723  0D18                      ;
724  0D18                      ; DIVISION LOOP (DIVISION PART 2)
725  0D18                      ;
726  0D18   26 CA     NOSP05     ROL     TOPL
727  0D1A   26 CB                ROL     TOPH
728  0D1C   88                   DEY                         DECREMENT DIGIT COUNTER
729  0D1D   30 4C                BMI     DONE05              IF DONE, RESULT IS IN TOP
730  0D1F   26 C8                ROL     DL                  SHIFT A BIT OF TOP INTO DIVISION REGS
731  0D21   26 C9                ROL     DH
732  0D23   38                   SEC
733  0D24   A5 C8                LDA     DL                  SUBTRACT DIVISOR FROM DIVISION REGISTERS
734  0D26   E5 CC                SBC     DELTL
735  0D28   85 C8                STA     DL
736  0D2A   A5 C9                LDA     DH
737  0D2C   E5 CD                SBC     DELTH
738  0D2E   85 C9                STA     DH
739  0D30   B0 0F                BCS     SET05               DIVISION REGISTERS GT DIVISOR
740  0D32   A5 C8                LDA     DL                  DIVISION REGISTERS WERE LT DIVISOR
741  0D34   65 CC                ADC     DELTL               ADD DIVISOR BACK
742  0D36   85 C8                STA     DL
743  0D38   A5 C9                LDA     DH
744  0D3A   65 CD                ADC     DELTH
745  0D3C   85 C9                STA     DH
746  0D3E   4C 0D 0D             JMP     CLER05
747  0D41   20 3A 0F  SET05      JSR     ENPT1
748  0D44   38                   SEC
749  0D45   24 80                BIT     WINDNG
750  0D47   10 CF                BPL     NOSP05              TEST FOR STOP REQUEST
751  0D49   4C 0D 0B             JMP     STOP
752  0D4C
753  0D4C                      ;
754  0D4C                      ; BAD DELT (NEGATIVE OR ZERO)
```

```
755  0D4C                    ;
756  0D4C  20 3A 0F   ERROR05  JSR  ENPT1
757  0D4F  C6 DE               DEC  UTIME
758  0D51  D0 85               BNE  DIVA05      TRY AGAIN
759  0D53
760  0D53                    ;
761  0D53                    ; FATAL ERROR CAN NOT SLOW MOTOR DOWN
762  0D53                    ;
763  0D53  A9 C7               LDA  #$C7
764  0D55  85 D6               STA  HALFW
765  0D57  85 80               STA  WINDNG      OUTPUT TO WINDING W1, W2, W4 ON
766  0D59                    ;
767  0D59                    ;
768  0D59                    ; TWO SECOND DELAY
769  0D59                    ;
770  0D59  A0 10               LDY  #16
771  0D5B  A9 60      WAIT05   LDA  #MS125
772  0D5D  85 87               STA  TIMEW0      WRITE TO TIMER W/O INTERRUPT 125 MSEC
773  0D5F  A5 84      DLAY05   LDA  TIMERR      READ TIMER
774  0D61  10 FC               BPL  DLAY05
775  0D63  88                  DEY
776  0D64  D0 F5               BNE  WAIT05
777  0D66  A9 08               LDA  #$08        SET ERROR TO 1
778  0D68  4C 0F 0A            JMP  R1
779  0D6B
780  0D6B                    ;
781  0D6B                    ; DIVISION COMPLETE RESULT IS IN TOP
782  0D6B                    ;
783  0D6B  20 3A 0F   DONE05   JSR  ENPT1
784  0D6E
785  0D6E                    ;
786  0D6E                    ; ADD 23 TO THE RESULT
787  0D6E                    ;
788  0D6E  18                  CLC
789  0D6F  A5 CA               LDA  TOPL
790  0D71  69 17               ADC  #23
791  0D73  85 CA               STA  TOPL
792  0D75  A5 CB               LDA  TOPH
793  0D77  69 00               ADC  #0
794  0D79  85 CB               STA  TOPH
795  0D7B                    ;
796  0D7B                    ;
797  0D7B                    ; DIVIDE BY TWO
798  0D7B                    ;
799  0D7B  46 CB               LSR  TOPH
800  0D7D  66 CA               ROR  TOPL
801  0D7F                    ;
802  0D7F                    ;
803  0D7F                    ; SUBTRACT FROM BP6
804  0D7F                    ;
805  0D7F  38                  SEC
806  0D80  A5 C4               LDA  BP6L
807  0D82  E5 CA               SBC  TOPL
808  0D84  85 C2               STA  BP4L
809  0D86  A5 C5               LDA  BP6H
810  0D88  E5 CB               SBC  TOPH
811  0D8A  85 C3               STA  BP4H
812  0D8C
813  0D8C                    ;
814  0D8C                    ; IS BP4 GT CSTEP?
815  0D8C                    ;
816  0D8C  38         LOOP05   SEC
817  0D8D  A5 D2               LDA  CSTEPL
818  0D8F  E5 C2               SBC  BP4L
819  0D91  A5 D3               LDA  CSTEPH
820  0D93  E5 C3               SBC  BP4H
821  0D95  B0 0A               BCS  G400
822  0D97  20 3A 0F            JSR  ENPT1
823  0D9A  24 80               BIT  WINDNG      TEST FOR STOP REQUEST
824  0D9C  10 EE               BPL  LOOP05
825  0D9E  4C 00 0B            JMP  STOP
826  0DA1
827  0DA1                    ;
828  0DA1                    ; APPLY ZSUP FOR FOUR FULL STEPS
829  0DA1                    ;
830  0DA1  A9 04      G400     LDA  #4
831  0DA3  85 82               STA  IOWORD      SET ZSUP TO 1 (ACK = 0, ERROR = 0)
832  0DA5  A0 04               LDY  #4
833  0DA7  20 3A 0F   FOUR05   JSR  ENPT1
834  0DAA  88                  DEY
835  0DAB  D0 FA               BNE  FOUR05
836  0DAD                    ;
837  0DAD                    ; DECELERATE MOTOR
838  0DAD                    ; ALL INTERNAL LABELS IN THIS SECTION END WITH "06"
839  0DAD                    ;
840  0DAD  8A         G500     TXA
841  0DAE  18                  CLC
842  0DAF  69 04               ADC  #4          CCY FOUR TIMES
843  0DB1  29 07               AND  #$07
844  0DB3  AA                  TAX
845  0DB4  BD 00 0F            LDA  TABLE,X
846  0DB7  85 D6               STA  HALFW
847  0DB9  A9 04               LDA  #4
848  0DBB  85 82               STA  IOWORD      SET ZSUP TO 1 (ACK = 0, ERROR = 0)
849  0DBD
850  0DBD                    ;
851  0DBD                    ; DECELERATE MOTOR UNTIL IT SLOWS TO THE LOW VELOCITY CONSTANT
852  0DBD                    ;
853  0DBD  24 05               BIT  ENCODE
854  0DBF  10 12               BPL  ODDW06
855  0DC1  A0 3F      EVNW06   LDY  #ELVC06     WAIT FOR EVEN HALF STEP
856  0DC3  88         EVNL06   DEY
857  0DC4  F0 33               BEQ  G531        CHECK FOR LOW SPEED PER HALF STEP OF
858  0DC6                                       ; ELVC06*10 +4 + 34
859  0DC6  A5 05               LDA  ENCODE
860  0DC8  30 F9               BMI  EVNL06      HAS EVEN HALF STEP OCCURRED YET?
861  0DCA  45 E0               EOR  DIRONE
862  0DCC  29 40               AND  #$40
863  0DCE  D0 23               BNE  G530        WRONG DIRECTION
864  0DD0  20 A3 0F            JSR  ENPT2A      (NO DTC) ENPT2A TAKES APPROX. 76 CYCLES
865  0DD3  A0 3B      ODDW06   LDY  #ULVC06     WAIT FOR ODD HALF STEP
866  0DD5  88         ODDL06   DEY
867  0DD6  F0 1B               BEQ  G530        CHECK FOR LOW SPEED PER HALF STEP OF
868  0DD8                                       ; ODDL06*10 +4 + ENPT2A TIME
869  0DD8  A5 05               LDA  ENCODE
870  0DDA  10 F9               BPL  ODDL06      HAS ODD HALF STEP OCCURRED YET?
871  0DDC  45 E0               EOR  DIRONE
872  0DDE  29 40               AND  #$40
```

```
874  0UE0  00 0F              BNE   EVNW06
875  0UE2  20 B2 0E           JSR   BADODD              ENTRY POINT (WRONG DIRECTION)
876  0UE5                ;
877  0UE5
878  0UE5  24 08       6532   BIT   SFLAG
879  0UE7  30 16              BMI   BIASD               SFLAG IS 1, STOP REQUESTED, JUMP TO
880  0UE9                                               ;   BIAS DAMPING
881  0UE9  A9 80              LDA   #$80
882  0UEB  85 00              STA   DTCF                SET DTCF
883  0UED  20 A3 0F           JSR   ENPT2A
884  0UF0  4C 52 0C           JMP   LOWV                JUMP TO LOW VELOCITY
885  0UF3                ;
886  0UF3
887  0UF3  20 CE 0E    6530   JSR   BADEVN              ENTRY POINT (WRONG DIREC OR REACHED LVC)
888  0UF6  4C E5 00           JMP   6532
889  0UF9  20 E2 0E    6531   JSR   NOEVEN              ENTRY POINT (REACHED LVC)
890  0UFC  4C E5 00           JMP   6532
892  0UFF                ;
893  0UFF                ;    BIAS DAMPING
894  0UFF                ;    ALL INTERNAL LABELS IN THIS SECTION END WITH "07"
895  0UFF                ;
896  0UFF                ;    ALIGN X TO ITS FINAL POSITION
897  0UFF                ;
898  0UFF  8A          BIASD  TXA
899  0E00  38                 SEC
900  0E01  E5 E0              SBC   DIRONE              CCV
901  0E03  29 07              AND   #$07
902  0E05  AA                 TAX
903  0E06  BD 00 0F           LDA   TABLE,X
904  0E09  85 DC              STA   W                   SAVE RESULT
905  0E0B
906  0E0B                ;
907  0E0B                ;    PREPARE TO EXCITE ADJACENT COILS
908  0E0B                ;
909  0E0B  0A                 ASL   A                   EXCITE ADJACENT LEFT
910  0E0C  69 00              ADC   #0
911  0E0E  05 DC              ORA   W
912  0E10  85 DC              STA   W
913  0E12  4A                 LSR   A                   EXCITE ADJACENT RIGHT
914  0E13  90 02              BCC   CUM207
915  0E15  09 80              ORA   #$80
916  0E17  05 DC       CUM207 ORA   W
917  0E19  85 DC              STA   W
918  0E1B
919  0E1B                ;
920  0E1B                ;    TURN OFF ALL WINDINGS
921  0E1B                ;
922  0E1B  A9 00              LDA   #0                  TURN OFF ALL WINDINGS
923  0E1D  85 D8              STA   HALFW
924  0E1F  85 80              STA   WINDNG              OUTPUT TO WINDINGS
925  0E21
926  0E21                ;
927  0E21                ;    RESET UNEXPECTED STOP TIMER
928  0E21                ;
929  0E21  A9 23              LDA   #MS40               40 MSEC TIME INTERVAL
930  0E23  85 8F              STA   TIMERW              WRITE TO TIMER WITH INTERRUPT
931  0E25
932  0E25                ;
933  0E25                ;    WAIT FOR EVEN HALF STEP
934  0E25                ;
935  0E25  24 05       WAIT07 BIT   ENCODE
936  0E27  10 FC              BPL   WAIT07              WAIT FOR ODD HALF STEP FIRST
937  0E29  24 05       ODD07  BIT   ENCODE
938  0E2B  30 FC              BMI   ODD07               HAS A HIGH TO LOW TRANSITION OCCURRED?
939  0E2D
940  0E2D                ;
941  0E2D                ;    TURN ON BIAS DAMPING (THREE WINDINGS ON)
942  0E2D                ;
943  0E2D  A5 DC              LDA   W
944  0E2F  85 D8              STA   HALFW
945  0E31  85 80              STA   WINDNG
946  0E33
947  0E33                ;
948  0E33                ;    SET TIMER W/O INTERRUPT
949  0E33                ;
950  0E33  A9 09       6701   LDA   #MS10               10 MSEC TIME INTERVAL
951  0E35  85 87              STA   TIMEWO              WRITE TO TIMER
952  0E37
953  0E37                ;
954  0E37                ;******************* NO CHECK FOR OVERSHOOT ***********
955  0E37                ;
956  0E37
957  0E37                ;    TIMER FINISHED?
958  0E37                ;
959  0E37  A5 84       DAMP07 LDA   TIMERR              READ TIMER
960  0E39  10 FC              BPL   DAMP07
961  0E3B
962  0E3B                ;
963  0E3B                ;    TIMER FINISHED, MOVE COMPLETE
964  0E3B
965  0E3B  BD 00 0F           LDA   TABLE,X
966  0E3E  85 80              STA   WINDNG              REMOVE BIAS DAMPING
967  0E40  24 06              BIT   HFLAG               WAS THIS A HUMING?
968  0E42  30 17              BMI   HUME07              YES, DONE
969  0E44
970  0E44                ;
971  0E44                ;    MOVE COMPLETE, CHECK TO SEE IF MOVED CORRECT NUMBER OF STEPS
972  0E44                ;
973  0E44  38                 SEC
974  0E45  A5 02              LDA   CSTEPL
975  0E47  E5 C4              SBC   BP6L
976  0E49  85 02              STA   CSTEPL
977  0E4B  A5 03              LDA   CSTEPH
978  0E4D  E5 C5              SBC   BP6H
979  0E4F  85 03              STA   CSTEPH
980  0E51  D0 13              BNE   FIX07
981  0E53  A5 02              LDA   CSTEPL
982  0E55  D0 0F              BNE   FIX07
983  0E57
984  0E57                ;
985  0E57                ;    MOVED CORRECT NUMBER OF STEPS
986  0E57                ;
987  0E57  24 09              BIT   ERFLAG              DID AN ERROR OCCUR?
988  0E59  30 04              BMI   BAD07
989  0E5B  A9 14       HUME07 LDA   #$14                NO ERRORS
990  0E5D  D0 02              BNE   FIN07               JUMP TO FIN07 (RESULT IS NEVER 0)
991  0E5F  A9 1C       BAD07  LDA   #$1C                ERROR OCCURRED
992  0E61  85 02       FIN07  STA   IOWORD              SET ACK, SET ZSUP, ERROR SET IF NECESSARY
```

```
993   0E63  4C 19 0A              JMP    MONITR
994   0E66
995   0E66          ; CORRECT THE LOC
996   0E66          ;
997   0E66          ;
998   0E66  24 DA       FIX07     BIT    FIX
999   0E68  30 10                 BMI    NFIX07
1000  0E6A  18                    CLC                    FIX = 0
1001  0E6B  A5 C6                 LDA    LOCL
1002  0E6D  65 D2                 ADC    CSTEPL
1003  0E6F  85 C6                 STA    LOCL
1004  0E71  A5 C7                 LDA    LOCH
1005  0E73  65 D3                 ADC    CSTEPH
1006  0E75  85 C7                 STA    LOCH
1007  0E77  4C 87 0E              JMP    CHEK07
1008  0E7A  38          NFIX07    SEC                    FIX IS NOT 0
1009  0E7B  A5 C6                 LDA    LOCL
1010  0E7D  E5 D2                 SBC    CSTEPL
1011  0E7F  85 C6                 STA    LOCL
1012  0E81  A5 C7                 LDA    LOCH
1013  0E83  E5 D3                 SBC    CSTEPH
1014  0E85  85 C7                 STA    LOCH
1015  0E87  24 D8       CHEK07    BIT    SFLAG           WAS STOP REQUESTED?
1016  0E89  30 04                 BMI    BAD07           YES
1017  0E8B
1018  0E8B
1019  0E8B          ; CORRECT THE OVERSHOOT
1020  0E8B
1021  0E8B  A9 80                 LDA    #$80
1022  0E8D  85 D9                 STA    ERFLAG          SET ERFLAG
1023  0E8F  A9 01                 LDA    #$01
1024  0E91  24 82                 BIT    IOWORD          TEST A/I INDICATOR
1025  0E93  F0 03                 BEQ    INC07
1026  0E95  4C 51 0B              JMP    G1              ABSOLUTE MODE
1027  0E98  A5 D3       INC07     LDA    CSTEPH          INCREMENTAL MODE
1028  0E9A  85 C5                 STA    BP6H
1029  0E9C  A5 D2                 LDA    CSTEPL
1030  0E9E  85 C4                 STA    BP6L
1031  0EA0  A5 E0                 LDA    DIRONE
1032  0EA2  49 FE                 EOR    #$FE            COMPLEMENT DIRECTION
1033  0EA4  85 E0                 STA    DIRONE
1034  0EA6  0A                    ASL    A
1035  0EA7  85 E1                 STA    DIRTWO
1036  0EA9  A9 00                 LDA    #0
1037  0EAB  85 D7                 STA    ZFLAG           ZERO ZFLAG
1038  0EAD  85 82                 STA    IOWORD          SET ZSUP=0 (ACK=0,ERROR=0)
1039  0EAF  4C B4 0B              JMP    G7
1040  0EB2
1041  0EB2          ; MOTOR IS MOVING IN THE WRONG DIRECTION
1042  0EB2          ;
1043  0EB2
1044  0EB2  38          BADODD    SEC                    WRONG DIRECTION ODD HALF STEP
1045  0EB3  A5 D2                 LDA    CSTEPL          CSTEP=CSTEP-1
1046  0EB5  E9 01                 SBC    #1
1047  0EB7  85 D2                 STA    CSTEPL
1048  0EB9  A5 D3                 LDA    CSTEPH
1049  0EBB  E9 00                 SBC    #0
1050  0EBD  85 D3                 STA    CSTEPH
1051  0EBF  8A                    TXA
1052  0EC0  18          COMM06    CLC
1053  0EC1  65 E0                 ADC    DIRONE          CX
1054  0EC3  29 07                 AND    #$07
1055  0EC5  AA                    TAX
1056  0EC6  78                    SEI                    SET INTERRUPT DISABLE
1057  0EC7  BD DD 0F              LDA    TABLE,X
1058  0ECA  85 80                 STA    WINDNG          OUTPUT TO WINDINGS
1059  0ECC  D0 1B                 BNE    WRONGE          JUMP TO WAIT FOR EVEN HALF STEP AND
1060  0ECE                                               ;CHECK DIRECTION (RESULT IS NEVER 0)
1061  0ECE
1062  0ECE
1063  0ECE          ; MOTOR REACHED LVC OR IS MOVING IN WRONG DIRECTION
1064  0ECE
1065  0ECE  8A          BADEVN    TXA                    WRONG DIREC EVEN HALF STEP OR
1066  0ECF                                               ; TIME OUT WHILE WAITING FOR ODD
1067  0ECF  18                    CLC
1068  0ED0  65 E1                 ADC    DIRTWO          CX TWICE
1069  0ED2  29 07                 AND    #$07
1070  0ED4  AA                    TAX
1071  0ED5  78                    SEI                    SET INTERRUPT DISABLE
1072  0ED6  BD DD 0F              LDA    TABLE,X
1073  0ED9  85 80                 STA    WINDNG          OUTPUT TO WINDINGS
1074  0EDB  A9 23                 LDA    #MS40           40 MSEC TIME INTERVAL
1075  0EDD  85 8F                 STA    TIMERW          SET TIMER WITH INTERRUPT
1076  0EDF  4C FF 0E              JMP    WRONGO          WAIT FOR ODD HALF STEP AND CHECK DIRECTION
1077  0EE2  8A          NOEVEN    TXA                    TIME OUT WHILE WAITING FOR EVEN
1078  0EE3  18                    CLC
1079  0EE4  65 E1                 ADC    DIRTWO          CX TWICE
1080  0EE6  4C C0 0E              JMP    COMM06
1081  0EE9
1082  0EE9
1083  0EE9          ; WAIT FOR HALF STEP AND CHECK DIRECTION ROUTINE
1084  0EE9          ; ALL INTERNAL LABELS IN THIS SECTION END WITH '98'
1085  0EE9
1086  0EE9  A5 05       WRONGE    LDA    ENCODE          WAIT FOR HIGH TO LOW TRANSITION
1087  0EEB  30 FC                 BMI    WRONGE
1088  0EED  45 E0                 EOR    DIRONE          CHECK DIRECTION
1089  0EEF  29 40                 AND    #$40
1090  0EF1  F0 3C                 BEQ    OKE98           CORRECT DIRECTION
1091  0EF3  8A                    TXA                    WRONG DIRECTION
1092  0EF4  38                    SEC
1093  0EF5  E5 E0                 SBC    DIRONE          CCX
1094  0EF7  29 07                 AND    #$07
1095  0EF9  AA                    TAX
1096  0EFA  BD DD 0F              LDA    TABLE,X
1097  0EFD  85 80                 STA    WINDNG          OUTPUT TO WINDINGS
1098  0EFF  A5 05       WRONGO    LDA    ENCODE          WAIT FOR LOW TO HIGH TRANSITION
1099  0F01  10 FC                 BPL    WRONGO
1100  0F03  A0 23                 LDY    #MS40           40 MSEC TIME INTERVAL
1101  0F05  84 8F                 STY    TIMERW          SET TIMER WITH INTERRUPT
1102  0F07  45 E0                 EOR    DIRONE          CHECK DIRECTION
1103  0F09  29 40                 AND    #$40
1104  0F0B  D0 1B                 BNE    OKO98           CORRECT DIRECTION
1105  0F0D  38                    SEC
1106  0F0E  A5 D2                 LDA    CSTEPL          CSTEP=CSTEP-1
1107  0F10  E9 01                 SBC    #1
1108  0F12  85 D2                 STA    CSTEPL
1109  0F14  A5 D3                 LDA    CSTEPH
1110  0F16  E9 00                 SBC    #0
1111  0F18  85 D3                 STA    CSTEPH
```

```
1112  0F1A  8A               TXA
1113  0F1B  38               SEC
1114  0F1C  E5 E0            SBC   DIRONE      CCY
1115  0F1E  29 07            AND   #$07
1116  0F20  AA               TAX
1117  0F21  BD DD 0F         LDA   TABLE,X
1118  0F24  85 80            STA   WINDNG
1119  0F26  D0 C1            BNE   WRONGE      OUTPUT TO WINDINGS
                                               JUMP TO WRONGE (RESULT IS NEVER 0)
1120  0F28  8A       OK09A   TXA
1121  0F29  18               CLC
1122  0F2A  65 E0            ADC   DIRONE      CX
1123  0F2C  29 07            AND   #$07
1124  0F2E  AA               TAX
1125  0F2F  BD DD 0F  OKE9A  LDA   TABLE,X
1126  0F32  85 DB            STA   HALFW
1127  0F34  85 80            STA   WINDNG
1128  0F36  85 00            STA   ZERO        OUTPUT TO WINDINGS
                                               WRITE TO ADDRESS 0 TO RESET IRQ
1129  0F38  58               CLI               CLEAR INTERRUPT DISABLE
1130  0F39  60               RTS
1131
1132  0F3A
1133  0F3A           ; SUBROUTINE ENPT1 (EVEN HALF STEPS, HIGH SPEED)
1134  0F3A           ; ALL INTERNAL LABELS IN THIS SECTION END WITH '01'
1135  0F3A
1136  0F3A  24 05    ENPT1   BIT   ENCODE
1137  0F3C  10 FC            BPL   ENPT1       WAIT FOR ODD HALF STEP
1138  0F3E  24 05    ENPT1A  BIT   ENCODE
1139  0F40  30 FC            BMI   ENPT1A      WAIT FOR EVEN HALF STEP
1140  0F42
1141  0F42
1142  0F42           ; ENPT1A IS AN ENTRY POINT
1143  0F42
1144  0F42           ; RESET THE TIMER
1145  0F42
1146  0F42  A9 23            LDA   #MS40       40 MSEC TIME INTERVAL
1147  0F44  85 8F            STA   TIMERW      SET TIMER WITH INTERRUPT
1148  0F46
1149  0F46
1150  0F46           ; COMMUTATE
1151  0F46
1152  0F46  8A               TXA
1153  0F47  18               CLC
1154  0F48  65 E0            ADC   DIRONE      CX
1155  0F4A  29 07            AND   #$07
1156  0F4C  AA               TAX
1157  0F4D  BD DD 0F         LDA   TABLE,X
1158  0F50  85 80            STA   WINDNG      OUTPUT TO WINDINGS
1159  0F52  8A               TXA
1160  0F53  18               CLC
1161  0F54  65 E0            ADC   DIRONE      CX
1162  0F56  29 07            AND   #$07
1163  0F58  AA               TAX
1164  0F59  BD DD 0F         LDA   TABLE,X
1165  0F5C  85 DB            STA   HALFW
1166  0F5E
1167  0F5E
1168  0F5E           ; INCREMENT CSTEP
1169  0F5E
1170  0F5F  18               CLC
1171  0F5F  A5 D2            LDA   CSTEPL
1172  0F61  69 01            ADC   #1
1173  0F63  85 D2            STA   CSTEPL
1174  0F65  A5 D3            LDA   CSTEPH
1175  0F67  69 00            ADC   #0
1176  0F69  85 D3            STA   CSTEPH
1177  0F6B
1178  0F6B
1179  0F6B           ; MOVE TNEW TO TOLD
1180  0F6B
1181  0F6D  A5 CE            LDA   TNEWL
1182  0F6D  85 D0            STA   TOLDL
1183  0F6F  A5 CF            LDA   TNEWH
1184  0F71  85 D1            STA   TOLDH
1185  0F73
1186  0F73
1187  0F73           ; READ NEW TIME  COMPARE WITH HVC AND STORE IN TNEW
1188  0F73
1189  0F73  38               SEC
1190  0F74  A5 03            LDA   LSICL
1191  0F76  85 CE            STA   TNEWL
1192  0F78  E5 D4            SBC   HVCL        STORE LOW BYTE
1193  0F7A  A5 04            LDA   LSICH
1194  0F7C  85 CF            STA   TNEWH       STORE HIGH BYTE
1195  0F7E  E5 D5            SBC   HVCH
1196  0F80  B0 06            BCS   SLOW01
1197  0F82  A9 00            LDA   #0          TOO FAST
1198  0F84  85 80            STA   WINDNG      OUTPUT 0 TO WINDINGS
1199  0F86  85 DB            STA   HALFW
1200  0F88  60       SLOW01  RTS
1201
1202  0F89
1203  0F89           ; IRQ INTERRUPT ROUTINE
1204  0F89           ; ODD HALF STEP ROUTINE
1205  0F89           ; ALL INTERNAL LABELS IN THIS SECTION END WITH '08'
1206  0F89
1207  0F89  85 E2    IRQV    STA   TEMPA       TEMPORARY SAVE A
1208  0F8B  24 DD            BIT   DTCF        DELAY TO COMMUTATE?
1209  0F8D  10 07            BPL   NDTC08      NO DELAY TO COMMUTATE
1210  0F8F  A9 43            LDA   #DTCIRQ     TIME DELAY
1211  0F91  38               SEC
1212  0F92  E9 01    DLAY08  SBC   #1
1213  0F94  D0 FC            BNE   DLAY08
1214  0F96  A5 DB    NDTC08  LDA   HALFW
1215  0F98  85 80            STA   WINDNG
1216  0F9A  85 00            STA   ZERO        RESET IRQ INTERRUPT BY WRITING TO ADDR 0
1217  0F9C  A5 E2            LDA   TEMPA       RESTORE A
1218  0F9E  40               RTI
1219
1220  0F9F
1221  0F9F           ; SUBROUTINE ENPT2 (EVEN HALF STEPS, SLOW SPEED)
1222  0F9F           ; ALL INTERNAL LABELS IN THIS SECTION END WITH '02'
1223  0F9F
1224  0F9F  24 05    ENPT2   BIT   ENCODE
1225  0FA1  10 FC            BPL   ENPT2       WAIT FOR ODD HALF STEP
1226  0FA3  24 05    ENPT2A  BIT   ENCODE
1227  0FA5  30 FC            BMI   ENPT2A      WAIT FOR EVEN HALF STEP
1228  0FA7
1229  0FA7
1230  0FA7           ; (ENPT2A IS AN ENTRY POINT)
1231  0FA7
1232  0FA7           ; RESET THE TIMER
```

```
1233  0FA7                          LDA  #MS40       40 MSEC TIME INTERVAL
1234  0FA7  A9 23                   STA  TIMERW      SET TIMER W/ INTERRUPT
1235  0FA9  85 BF
1236  0FAB          ;
1237  0FAB          ; DELAY TO COMMUTATE?
1238  0FAB          ;
1239  0FAB  24 DD            BIT  DTCF
1240  0FAD  10 08            BPL  NDTC02
1241  0FAF  A9 2A            LDA  #DTCCON           TIME DELAY
1242  0FB1  85 DE            STA  DTIME
1243  0FB3  C6 DE   DLAY02   DEC  DTIME
1244  0FB5  D0 FC            BNE  DLAY02
1245  0FB7          ;
1246  0FB7          ;
1247  0FB7          ; COMMUTATE
1248  0FB7          ;
1249  0FB7  8A      NDTC02   TXA
1250  0FB8  18               CLC
1251  0FB9  65 E0            ADC  DIRONE           CX
1252  0FBB  29 07            AND  #$07
1253  0FBD  AA               TAX
1254  0FBE  BD DD 0F          LDA  TABLE,X
1255  0FC1  85 B0             STA  WINDNG          OUTPUT TO WINDINGS
1256  0FC3  8A                TXA
1257  0FC4  18                CLC
1258  0FC5  65 E0              ADC  DIRONE         CX
1259  0FC7  29 07              AND  #$07
1260  0FC9  AA                 TAX
1261  0FCA  BD DD 0F            LDA  TABLE,X
1262  0FCD  85 UB               STA  HALFW
1263  0FCF          ;
1264  0FCF          ;
1265  0FCF          ; INCREMENT CSTEP
1266  0FCF          ;
1267  0FCF  18               CLC
1268  0FD0  A5 D2            LDA  CSTEPL
1269  0FD2  69 01            ADC  #1
1270  0FD4  85 D2            STA  CSTEPL
1271  0FD6  A5 D3            LDA  CSTEPH
1272  0FD8  69 00            ADC  #0
1273  0FDA  85 D3            STA  CSTEPH
1274  0FDC  60               RTS
1276  0FDD
1277  0FDD  83      TABLE    .BYTE $83        X=0   W1 ON
1278  0FDE  C1               .BYTE $C1        X=1   W4 & W1 ON
1279  0FDF  E0               .BYTE $E0        X=2   W4 ON
1280  0FE0  70               .BYTE $70        X=3   W4 & W3 ON
1281  0FE1  38               .BYTE $38        X=4   W3 ON
1282  0FE2  1C               .BYTE $1C        X=5   W3 & W2 ON
1283  0FE3  0E               .BYTE $0E        X=6   W2 ON
1284  0FE4  07               .BYTE $07        X=7   W2 & W1 ON
1286  0FE5          ;
1287  0FE5          ;
1288  0FE5  8A      CXTWO    TXA
1289  0FE6  18               CLC
1290  0FE7  65 E1            ADC  DIRTWO
1291  0FE9  29 07            AND  #$07           CX TWICE
1292  0FEB  AA               TAX
1293  0FEC  BD DD 0F          LDA  TABLE,X
1294  0FEF  60               RTS
1295  0FF0          ;
1296  0FF0          ;
1297  0FF0          ;
1298  0FF0  8A      CXONE    TXA
1299  0FF1  18               CLC
1300  0FF2  65 E0            ADC  DIRONE          CX
1301  0FF4  29 07            AND  #$07
1302  0FF6  AA               TAX
1303  0FF7  60               RTS
1305  0FF8          ;
1306  0FF8          ;
1307  0FF8                   *=$0FFA             INTERRUPT VECTORS
1308  0FFA  16 0B            .WORD NMIV
1309  0FFC  00 0A            .WORD RESETV
1310  0FFE  89 0F            .WORD IRQV
1311  1000          ;
1312  1000                   .END
```

END OF MOS/TECHNOLOGY 650X ASSEMBLY VERSION 5
NUMBER OF ERRORS =   0,  NUMBER OF WARNINGS =   0

SYMBOL TABLE
SYMBOL     VALUE   LINE DEFINED         CROSS-REFERENCES

ABS04      0B7C      428   423
ALIN03     0A84      232   221
ALST03     0A8C      236   248
BADEVN     0ECE     1065   680   706   887
BADODD     0EB2     1044   661   875
BAD07      0E5F      991   988  1016
BIASD      0DFF      898   578   594   879
BP1H       00C1       34   464   552
BP1L       00C0       33   467   493   497   500   501   550
BP4H       00C3       36   811   820
BP4L       00C2       35   808   818
BP6H       00C5       38   424   434   446   447   462   480   592   800   978  1028
BP6L       00C4       37   426   431   443   444   465   482   499   507   576   590
                                806   975  1030
CHEK07     0EB7     1015  1007
CLERB5     0D10      718   716
CLER05     0D0D      717   746
CLOS03     0AE8      312   293
COMM06     0EC0     1052  1080
COMP04     0B94      441   437
COM207     0E17      916   914
COM99      0B32      377   374
CSTEPH     00D3       52   518   551   591   819   977   979  1005  1013  1027  1048
                                1050  1109  1111  1174  1176  1271  1273
CSTEPL     00D2       51   520   549   575   589   817   974   976   981  1002  1010
                                1029  1045  1047  1106  1108  1171  1173  1268  1270
CXONE      0FF0     1298   312   315   530   533
```

| Symbol | Addr | | | | | | | | | | | |
|---|---|---|---|---|---|---|---|---|---|---|---|---|
| CXTWO | 0FE5 | 1288 | 247 | 254 | 256 | 527 | | | | | | |
| DAMP07 | 0E37 | 959 | 960 | | | | | | | | | |
| DDRIO | 0083 | 22 | 130 | | | | | | | | | |
| DDRWIN | 0081 | 20 | 128 | | | | | | | | | |
| DELTH | 00CD | 46 | 694 | 737 | 744 | | | | | | | |
| DELTL | 00CC | 45 | 690 | 697 | 734 | 741 | | | | | | |
| DELY03 | 0AFA | 318 | 319 | | | | | | | | | |
| DH | 00C9 | 42 | 634 | 731 | 736 | 738 | 743 | 745 | | | | |
| DIRONE | 00E0 | 65 | 212 | 225 | 283 | 373 | 415 | 448 | 450 | 650 | 658 | 673 |
| | | | 709 | 862 | 872 | 900 | 1031 | 1033 | 1053 | 1088 | 1093 | 1102 |
| | | | 1114 | 1122 | 1154 | 1161 | 1251 | 1258 | 1300 | | | |
| DIRTWO | 00E1 | 66 | 214 | 232 | 281 | 417 | 452 | 1035 | 1068 | 1079 | 1290 | |
| DIVA05 | 0CD8 | 686 | 655 | 758 | | | | | | | | |
| DL | 00C8 | 41 | 633 | 730 | 733 | 735 | 740 | 742 | | | | |
| DLAY02 | 0F83 | 1243 | 1244 | | | | | | | | | |
| DLAY03 | 0A92 | 239 | 240 | | | | | | | | | |
| DLAY05 | 0D5F | 773 | 774 | | | | | | | | | |
| DLAY08 | 0F92 | 1212 | 1213 | | | | | | | | | |
| DONE05 | 0D6B | 783 | 679 | 729 | | | | | | | | |
| DTCCON | 002A | 96 | 1241 | | | | | | | | | |
| DTCF | 00DD | 62 | 193 | 517 | 566 | 882 | 1208 | 1239 | | | | |
| DTCIRQ | 0043 | 106 | 1210 | | | | | | | | | |
| DTIME | 00DE | 63 | 638 | 757 | 1242 | 1243 | | | | | | |
| ELVC06 | 003F | 99 | 856 | | | | | | | | | |
| ENCODE | 0005 | 14 | 569 | 646 | 648 | 656 | 854 | 860 | 870 | 935 | 937 | 1086 |
| | | | 1098 | 1136 | 1138 | 1224 | 1226 | | | | | |
| ENPT1 | 0F3A | 1136 | 264 | 540 | 613 | 717 | 747 | 756 | 783 | 822 | 833 | 1137 |
| ENPT1A | 0F3E | 1138 | 653 | 678 | 714 | 1139 | | | | | | |
| ENPT2 | 0F9F | 1224 | 595 | 1225 | | | | | | | | |
| ENPT2A | 0FA3 | 1226 | 865 | 883 | 1227 | | | | | | | |
| ERFLAG | 00D9 | 58 | 330 | 338 | 362 | 403 | 987 | 1022 | | | | |
| ERR05 | 0D4C | 756 | 695 | 699 | | | | | | | | |
| EVEN05 | 0C9B | 648 | 649 | 660 | | | | | | | | |
| EVNL06 | 0DC3 | 857 | 861 | | | | | | | | | |
| EVNW06 | 0DC1 | 856 | 874 | | | | | | | | | |
| FIN07 | 0E61 | 992 | 990 | | | | | | | | | |
| FIX | 00A | 59 | 439 | 454 | 998 | | | | | | | |
| FIX07 | 0E66 | 998 | 980 | 982 | | | | | | | | |
| FOUR05 | 0DA7 | 833 | 835 | | | | | | | | | |
| G1 | 0B51 | 404 | 1026 | | | | | | | | | |
| G200 | 0C82 | 621 | **** | | | | | | | | | |
| G400 | 0DA1 | 830 | 821 | | | | | | | | | |
| G500 | 0DAD | 841 | 339 | 560 | | | | | | | | |
| G530 | 0DF3 | 887 | 864 | 868 | | | | | | | | |
| G531 | 0DF9 | 889 | 858 | | | | | | | | | |
| G532 | 0DE5 | 878 | 888 | 890 | | | | | | | | |
| G7 | 0BB4 | 462 | 1039 | | | | | | | | | |
| G701 | 0E33 | 950 | 307 | 331 | 382 | | | | | | | |
| HALFW | 00DB | 60 | 144 | 257 | 305 | 354 | 380 | 389 | 529 | 539 | 764 | 847 |
| | | | 923 | 944 | 1126 | 1165 | 1199 | 1214 | 1262 | | | |
| HFLAG | 00D6 | 55 | 192 | 300 | 407 | 967 | | | | | | |
| HMOV03 | 0AAE | 264 | 270 | | | | | | | | | |
| HOMER | 0A4E | 187 | 160 | | | | | | | | | |
| HOME07 | 0E5B | 989 | 968 | | | | | | | | | |
| HOME1 | 00DF | 64 | 136 | 161 | 191 | 299 | | | | | | |
| HOMH03 | 00D5 | 83 | 198 | | | | | | | | | |
| HOML03 | 00D4 | 82 | 200 | | | | | | | | | |
| HVCH | 00D5 | 54 | 199 | 473 | 608 | 1195 | | | | | | |
| HVCL | 00D4 | 53 | 201 | 475 | 604 | 609 | 1192 | | | | | |
| INC07 | 0E98 | 1027 | 1025 | | | | | | | | | |
| IOWORD | 0082 | 21 | 133 | 188 | 220 | 223 | 269 | 274 | 292 | 408 | 422 | 510 |
| | | | 566 | 612 | 641 | 705 | 831 | 849 | 992 | 1024 | 1038 | |
| IRQV | 0F89 | 1207 | 1310 | | | | | | | | | |
| LEAD03 | 0AA1 | 254 | 242 | | | | | | | | | |
| LOCH | 00C7 | 40 | 189 | 433 | 435 | 455 | 1004 | 1006 | 1012 | 1014 | | |
| LOCL | 00C6 | 39 | 190 | 430 | 457 | 1001 | 1003 | 1009 | 1011 | | | |
| LOCNEG | 0BBE | 438 | 436 | | | | | | | | | |
| LOOK00 | 0A2E | 158 | 148 | 162 | | | | | | | | |
| LOOP04 | 0C1C | 540 | 553 | | | | | | | | | |
| LOOP05 | 0D8C | 816 | 824 | | | | | | | | | |
| LOWV | 0C52 | 588 | 596 | 884 | | | | | | | | |
| LSICH | 0004 | 13 | 1193 | | | | | | | | | |
| LSICL | 0003 | 12 | 1190 | | | | | | | | | |
| MASK83 | 0AA0 | 249 | 241 | | | | | | | | | |
| MONITR | 0A19 | 143 | 511 | 993 | | | | | | | | |
| MUN00 | 0A1F | 146 | 180 | | | | | | | | | |
| MOVER | 0B4D | 402 | 170 | | | | | | | | | |
| MOVH04 | 0001 | 87 | 472 | | | | | | | | | |
| MOVL04 | 0098 | 86 | 474 | | | | | | | | | |
| MS10 | 0009 | 90 | 950 | | | | | | | | | |
| MS125 | 006D | 94 | 771 | | | | | | | | | |
| MS16 | 000E | 91 | 237 | | | | | | | | | |
| MS40 | 0023 | 92 | 390 | 521 | 929 | 1074 | 1100 | 1146 | 1234 | | | |
| MS46 | 0028 | 93 | 316 | | | | | | | | | |
| NBIA04 | 0C60 | 595 | 593 | | | | | | | | | |
| NDTC02 | 0F87 | 1249 | 1240 | | | | | | | | | |
| NDTC08 | 0F96 | 1214 | 1209 | | | | | | | | | |
| NEAR03 | 0ACF | 290 | 227 | | | | | | | | | |
| NFIX07 | 0E7A | 1008 | 999 | | | | | | | | | |
| NGEVEN | 0CD2 | 680 | 652 | | | | | | | | | |
| NMIV | 0B16 | 348 | 1308 | | | | | | | | | |
| NOEVEN | 0EE2 | 1077 | 889 | | | | | | | | | |
| NOMR00 | 0A41 | 175 | 169 | | | | | | | | | |
| NOSP03 | 0AB8 | 268 | 266 | | | | | | | | | |
| NOSP04 | 0C26 | 548 | 542 | | | | | | | | | |
| NOSP05 | 0D1B | 726 | 720 | 750 | | | | | | | | |
| NTEMPA | 00E3 | 68 | 348 | 392 | | | | | | | | |
| ODDL06 | 0DD5 | 867 | 871 | | | | | | | | | |
| ODDW06 | 0DD3 | 866 | 855 | | | | | | | | | |
| ODD04 | 0C40 | 569 | 570 | | | | | | | | | |
| ODD05 | 0CAB | 656 | 647 | 657 | | | | | | | | | |
| ODD07 | 0E29 | 937 | 938 | | | | | | | | | |
| OFFW00 | 0A2B | 152 | 153 | | | | | | | | | |
| OKE98 | 0F2F | 1125 | 1090 | | | | | | | | | |
| OKO98 | 0F28 | 1120 | 1104 | | | | | | | | | |
| OK05 | 0CF3 | 704 | 696 | | | | | | | | | |
| OLVC06 | 0038 | 102 | 866 | | | | | | | | | |
| ONE04 | 0B65 | 415 | 413 | | | | | | | | | |
| ONW00 | 0A48 | 178 | 179 | | | | | | | | | |
| PUSH | 0002 | 11 | 207 | 409 | | | | | | | | |
| PUSL | 0001 | 10 | 425 | 429 | 456 | | | | | | | |
| RESETV | 0A00 | 123 | 1309 | | | | | | | | | |
| RI | 0A0F | 132 | 778 | | | | | | | | | |
| SETDIV | 0CB8 | 667 | 681 | | | | | | | | | |
| SETD03 | 0A6D | 211 | 208 | | | | | | | | | |
| SETP04 | 0BAE | 455 | 427 | 440 | | | | | | | | |
| SET05 | 0D41 | 747 | 739 | | | | | | | | | |
| SFLAG | 00D8 | 57 | 329 | 337 | 361 | 406 | 878 | 1015 | | | | |

```
SLOW01    0F68    1200  1196
SLOW99    0B3F     387   355
SMAL04    0BE9     505   486
STOP      0B0D     336   267   543  721  751  825
STOR04    0C4D     579   577
STRD03    0A6F     212   210
STRT04    0BF8     516   481   484  502  508
TABLE     0FDD    1277   175   235  313  379  387  534  579  676  712  846
                         903   965 1057 1072 1096 1117 1125 1157 1164 1254
                        1261  1293
TEMPA     00E2      67  1207  1217
TEST03    0AD1     291   321
TIMERR    0084      23   239   272  318  349  773  959
TIMERW    008F      27   391   522  930 1075 1101 1147 1235
TIMEWO    0087      25   238   317  772  951
TNEWH     00CF      48   605   691 1183 1194
TNEWL     00CE      47   602   687 1181 1191
TOFF00    0006      79   151
TOLDH     00D1      50   606   693 1184
TOLDL     00D0      49   603   689 1182
TUN00     0002      80   177
TUPH      00CB      44   670   692  727  792  794  709  810
TUPL      00CA      43   668   688  726  789  791  800  807
TYPE1     0C38     565   532
TYPE23    0C1A     539  ****
TYPE3     0C66     601   559
W         00DC      61   904   911  912  916  917  943
WAIT04    0C7C     613   615
WAIT05    0D5B     771   776
WAIT07    0E25     935   936
WINDNG    0080      19   135   145  147  150  159  148  176  236  255  265
                         306   314  381  388  528  541  580  677  713  719
                         749   765  823  924  945  846 1058 1073 1097 1118
                        1127  1158 1198 1215 1255
WRONGE    0EE9    1086  1059  1087 1119
WRONGO    0EFF    1098  1076  1099
ZERO      0000       9   258   301  326 1128 1216
ZFLAG     00D7      56   405   488  506  531  558 1037

INSTRUCTION  COUNT
        ADC     30
        AND     25
        ASL      6
        BCC      7
        BCS      5
        BEQ     10
        BIT     33
        BMI     15
        BNE     34
        BPL     21
        BRK      0
        BVC      1
        BVS      0
        CLC     22
        CLD      1
        CLI      5
        CLV      0
        CMP      4
        CPX      0
        CPY      0
        DEC      2
        DEX      0
        DEY     10
        EOR      8
        INC      0
        INX      0
        INY      0
        JMP     30
        JSR     29
        LDA    166
        LDX      3
        LDY     13
        LSR      6
        NOP      0
        ORA      4
        PHA      0
        PHP      0
        PLA      0
        PLP      0
        ROL      4
        ROR      3
        RTI      2
        RTS      5
        SBC     34
        SEC     22
        SED      0
        SEI      5
        STA    167
        STX      0
        STY      5
        TAX     21
        TAY      2
        TSX      0
        TXA     20
        TXS      2
        TYA      2

SYMBOLS =  170 (LIMIT =  400)    # BYTES = 1535 (LIMIT = 4096)
LINES  = 1312 (LIMIT = 3500)    # XREFS =  664 (LIMIT =  900)
```

What is claimed is:

1. An adaptive control system for a stepper motor comprising:
   a stepper motor;
   electrical means coupled to said stepper motor for driving said stepper motor a predetermined number of steps;
   said electrical means including means to temporarily decelerate said stepper motor during the time said stepper motor is being driven said predetermined number of steps; and
   computing means coupled to said stepper motor for calculating the deceleration needed to bring said stepper motor to a stop at the end of said predetermined number of steps.

2. The adaptive control system of claim 1 wherein said electrical means further includes
   means to decelerate said stepper motor in accordance with the deceleration requirements calculated by said computing means to stop said stepper motor at the end of said predetermined number of steps.

3. The adaptive control system of claim 2 wherein said electrical means includes means to accelerate said stepper motor to substantially the angular velocity that existed just prior to said temporary deceleration before decelerating said stepper motor to a stop in accordance with said calculation.

4. The adaptive control system according to claim 1 wherein
   said calculated deceleration consists of the number of decelerating steps needed to bring said stepper motor to a stop at the end of said predetermined number of steps.

5. The adaptive control system according to claim 4 wherein the number of steps (Ns) needed to decelerate said stepper motor to a stop is given by the equation $$Ns = \frac{0.5\, T1}{(T1 - T0)}$$

where T0 is the time interval during which said stepper motor traverses a predetermined distance and T1 is a subsequent time interval during which said stepper motor traverses the predetermined distance.

6. The adaptive control system according to claim 5 wherein
   the time interval T1 is greater than the time interval T0.

7. The adaptive control system according to claim 4 wherein the number of steps (Ns) needed to decelerate said stepper motor to a stop at the end of said predetermined number of steps is given by the equation $$Ns = \frac{0.5\, T1}{(T1 - T0)}$$

where T0 is the time interval during said temporary deceleration required for said stepper motor to traverse a predetermined angular distance and T1 is an adjacent time interval during said temporary deceleration required for said stepper motor to traverse an equal angular distance.

8. The adaptive control system according to claim 4 wherein the number of steps (Ns) needed to decelerate said stepper motor to a stop at the end of said predetermined number of steps is given by the equation $$NS = \frac{0.5\, T1}{(T1 - T0)} + n$$

where T0 is the time interval during said temporary deceleration required for said stepper motor to traverse at least one step, or fraction thereof, where T1 is the time interval during said temporary deceleration required for said stepper motor to traverse at least one subsequent and adjacent step, or fraction thereof, and where n is an integral number of steps of said stepper motor.

9. The adaptive control system according to claim 8 wherein the number of stepper motor steps, or fraction thereof, in time period T0 is equal to the number of steps, or fraction thereof, in said time period T1.

10. The adaptive control system according to claim 9 wherein said time period T1 is greater than said time period T0.

11. The adaptive control system according to claim 1 wherein
    said stepper motor is a variable reluctance, phase wound stepper motor.

12. The adaptive control system according to claim 1 wherein
    said temporary deceleration occurs about midway through said predetermined number of steps.

13. The adaptive control system according to claim 2 wherein
    said electrical driving means includes means for driving said stepper motor to a predetermined maximum angular velocity prior to said temporary deceleration and for driving said stepper motor to said maximum angular velocity prior to decelerating said stepper motor to a stop at the end of said predetermined number of steps.

14. The adaptive control system according to claim 1 wherein
    said temporary deceleration interval cannot exceed a predetermined number of steps of said stepper motor.

15. The adaptive control system according to claim 2 further including
    means to temporarily store a value indicative of the angular velocity of said stepper motor immediately preceeding said temporary deceleration, and
    said electrical driving means includes means to drive said stepping motor to said stored value of angular velocity subsequent to said temporary deceleration and prior to decelerating said stepper motor to a stop at the end of said predetermined number of steps.

16. The adaptive control system according to claim 2 wherein
    said temporary deceleration and said deceleration to a stop occurs only if the number of said predetermined number of steps to be traversed by said stepper motor exceeds a minimum number.

17. The adaptive control system according to claim 16 further including
    storage means coupled to said electrical means for storing the predetermined number of steps to be traversed by said stepper motor,
    said electrical means including means to sense the number of steps to be traversed by said stepper motor and to continuously accelerate said stepper motor for a selected portion of said predetermined number of steps followed by continuous deceleration of said stepper motor for the remainder of said predetermined number of steps when said predetermined number of steps is less than said minimum number.

18. The adaptive control system according to claim 17 wherein
said electrical means continuously accelerates said stepper motor for more than half of said steps and continuously decelerates said stepper motor for the remainder of said steps.

19. The adaptive control system according to claim 17 wherein
said electrical means continuously accelerates said stepper motor for about three quarters of said steps and continuously decelerates said stepper motor for the remainder of said steps.

20. The adaptive control system according to claim 2 further including
a transducer coupled to said stepper motor for providing a signal for each step traversed by said stepper motor and having a time duration equal to the time duration of the step,
said computing means adapted to receive said signal for computing the speed of said stepper motor.

21. The adaptive control system according to claim 20 wherein
said computing means keeps track of the number of steps traversed by said stepper motor in response to said signals.

22. The adaptive control system according to claim 20 wherein
said computing means is coupled to said electrical means for preventing said electrical means from driving said stepper motor in excess of a predetermined angular velocity.

23. The adaptive control system according to claim 2 further including
a transducer coupled to said stepper motor for providing a first signal and a second signal for each step traversed by said stepper motor with said first and second signals having a phase difference,
said computing means adapted to receive said first and second signals for computing the direction of rotation of said stepper motor.

24. The adaptive control system according to claim 1 wherein
said electrical means includes means to automatically stop said stepper motor in the event the speed of said stepper motor falls below a predetermined minimum speed while being driven by said electrical means.

25. A method of controlling a stepper motor including the steps of
driving a stepper motor for a predetermined number of steps,
temporarily decelerating said stepper motor while said stepper motor is traversing said predetermined number of steps,
measuring the deceleration characteristic of said stepper motor during said temporary deceleration interval, and
calculating the deceleration required to stop said stepper motor at the end of said predetermined number of steps from said measured deceleration characteristic.

26. The method of controlling a stepper motor according to claim 25 including the additional step of
decelerating said stepper motor to a stop in accordance with said calculated deceleration requirement.

27. The method of controlling a stepper motor according to claim 26 further including
accelerating said stepper motor to the angular velocity existing just prior to said temporary deceleration before decelerating said stepper motor to a stop in accordance with said calculated deceleration requirement.

28. The method of controlling a stepper motor according to claim 26 further including
sensing the angular velocity of said stepper motor just prior to said temporary deceleration, and
accelerating said stepper motor to said sensed angular velocity subsequent to said temporary deceleration and prior to said deceleration of said stepper motor to a stop at the end of said predetermined number of steps.

29. The method of controlling a stepper motor in accordance with claim 25 wherein
the step of measuring the deceleration characteristics includes the step of
determining the speed of said stepper motor during said temporary deceleration for adjacent and equal angular displacements.

30. The method of controlling a stepper motor in accordance with claim 29 wherein
the step of calculating the deceleration characteristics includes the step of
computing the number of decelerating steps required to bring said stepper motor to a stop from an angular velocity equal to the angular velocity existing just prior to said temporary deceleration and with a deceleration torque substantially equal to that applied to said stepper motor during said temporary deceleration.

31. The method of controlling a stepper motor according to claim 30 wherein
said deceleration torque over a step is nearly constant.

32. The method of controlling a stepper motor in accordance with claim 30 wherein
the number of decelerating steps (NS) is computed by the equation $$NS = \frac{0.5\, T1}{(T1 - T0)}$$

where T0 is the time interval during said temporary deceleration required for said stepper motor to traverse a predetermined distance and T1 is an adjacent time interval during said temporary deceleration required for said stepper motor to traverse an equal distance.

33. A method of controlling a stepper motor including the steps of
driving a stepper motor for a predetermined number of steps,
selecting one of a plurality of procedures for decelerating said stepper motor to a stop at the end of said predetermined number of steps based upon the number of steps said stepper motor is to be moved;
one of said procedures including:
temporarily decelerating said stepper motor while said stepper motor is traversing said predetermined number of steps,
measuring the deceleration characteristics of said stepper motor during said temporary deceleration interval, and
calculating the deceleration required to stop said stepper motor.

34. A method of controlling a stepper motor according to claim 33 wherein another one of said procedures includes
accelerating said stepper motor over a predetermined portion of said predetermined number of steps, and
decelerating said stepper motor to a stop during the remainder of said predetermined number of steps.

35. A method of controlling a stepper motor according to claim 33 further including the step of
preventing the speed of said stepper motor from exceeding a predetermined speed while said stepper is accelerated.

36. A method of controlling a stepper motor according to claim 33 further including the step of
stopping said stepper motor if the speed of said stepper motor falls below a predetermined minimum value while said stepper motor is being enclosed.

37. The method of controlling a stepper motor according to claim 33 further including the step of
monitoring the speed and position of said stepper motor.

38. The method of controlling a stepper motor according to claim 33 further including the step of
decelerating said stepper to a stop at the end of said predetermined number of steps in accordance with said calculated deceleration requirement.

* * * * *